(12) United States Patent
Grossman et al.

(10) Patent No.: US 9,892,419 B1
(45) Date of Patent: Feb. 13, 2018

(54) COUPON DEPOSIT ACCOUNT FRAUD PROTECTION SYSTEM

(75) Inventors: Glenn M. Grossman, Matthews, NC (US); Joseph A. Giordano, Waxhaw, NC (US)

(73) Assignee: Bank of America Corporation, Charlotte, NC (US)

( * ) Notice: Subject to any disclaimer, the term of this patent is extended or adjusted under 35 U.S.C. 154(b) by 1546 days.

(21) Appl. No.: 13/103,372

(22) Filed: May 9, 2011

(51) Int. Cl.
G06Q 30/00 (2012.01)
G06Q 30/02 (2012.01)

(52) U.S. Cl.
CPC ..... *G06Q 30/0207* (2013.01); *G06Q 30/0225* (2013.01)

(58) Field of Classification Search
CPC combination set(s) only.
See application file for complete search history.

(56) References Cited

U.S. PATENT DOCUMENTS

| | | |
|---|---|---|
| 5,041,851 A | 8/1991 | Nelson |
| 5,176,224 A | 1/1993 | Spector |
| 5,192,854 A | 3/1993 | Counts |
| 5,201,010 A | 4/1993 | Deaton et al. |
| 5,202,826 A | 4/1993 | McCarthy |
| 5,227,874 A | 7/1993 | Von Kohorn |
| 5,239,165 A | 8/1993 | Novak |
| 5,245,533 A | 9/1993 | Marshall |
| 5,250,789 A | 10/1993 | Johnsen |
| 5,256,863 A | 10/1993 | Ferguson et al. |
| 5,265,008 A | 11/1993 | Benton et al. |
| 5,283,734 A | 2/1994 | Von Kohorn |
| 5,285,278 A | 2/1994 | Holman |
| 5,287,181 A | 2/1994 | Holman |
| 5,305,196 A | 4/1994 | Deaton et al. |
| 5,353,218 A | 10/1994 | De Lapa et al. |
| 5,368,129 A | 11/1994 | Von Kohorn |
| 5,373,440 A | 12/1994 | Cohen et al. |
| 5,388,165 A | 2/1995 | Deaton et al. |

(Continued)

OTHER PUBLICATIONS

US 7,264,158, 09/2007, Williams (withdrawn)

(Continued)

*Primary Examiner* — William A Brandenburg
*Assistant Examiner* — Christopher Busch
(74) *Attorney, Agent, or Firm* — Weiss & Arons LLP; Michael A. Springs, Esq.

(57) ABSTRACT

Apparatus and methods for providing electronic coupons are provided. The apparatus and methods include a system that uses a plurality of coupon processors to pull coupon data from an electronic coupon platform upon the expiration of a predetermined time period. The apparatus and methods additionally include a system that uses an electronic coupon platform to pushes data to a plurality of coupon processors upon the expiration of a predetermined time period. The apparatus and methods also include a system that redeems electronic coupons by initiating a deposit of an amount of funds in a customer bank account at predetermined time intervals. The apparatus and methods further include an electronic coupon platform that sends an electronic notification to a plurality of coupon processors upon the receipt of data from a first coupon processor which relates to the receipt of customer payment card and/or loyalty card information.

4 Claims, 16 Drawing Sheets

(56) References Cited

U.S. PATENT DOCUMENTS

| | | |
|---|---|---|
| 5,398,326 A | 3/1995 | Lee |
| 5,398,932 A | 3/1995 | Eberhardt et al. |
| 5,417,424 A | 5/1995 | Snowden et al. |
| 5,420,606 A | 5/1995 | Begum et al. |
| 5,430,644 A | 7/1995 | Deaton et al. |
| 5,448,471 A | 9/1995 | Deaton et al. |
| 5,470,079 A | 11/1995 | Lestrange et al. |
| 5,471,669 A | 11/1995 | Lidman |
| 5,484,998 A | 1/1996 | Bejnar et al. |
| 5,491,326 A | 2/1996 | Marceau et al. |
| 5,492,370 A | 2/1996 | Chatwin et al. |
| 5,497,314 A | 3/1996 | Novak |
| 5,501,491 A | 3/1996 | Thompson |
| 5,508,731 A | 4/1996 | Kohorn |
| 5,517,015 A | 5/1996 | Curry et al. |
| 5,523,794 A | 6/1996 | Mankovitz et al. |
| 5,537,314 A | 7/1996 | Kanter |
| 5,539,450 A | 7/1996 | Handelman |
| 5,557,516 A | 9/1996 | Hogan |
| 5,570,465 A | 10/1996 | Tsakanikas |
| 5,588,649 A | 12/1996 | Blumberg et al. |
| 5,592,212 A | 1/1997 | Handelman |
| 5,592,376 A | 1/1997 | Hodroff |
| 5,592,560 A | 1/1997 | Deaton et al. |
| 5,603,078 A | 2/1997 | Henderson et al. |
| 5,612,527 A | 3/1997 | Ovadia |
| 5,612,868 A | 3/1997 | Off et al. |
| 5,613,012 A | 3/1997 | Hoffman et al. |
| 5,619,066 A | 4/1997 | Curry et al. |
| 5,620,079 A | 4/1997 | Molbak |
| 5,621,812 A | 4/1997 | Deaton et al. |
| 5,638,457 A | 6/1997 | Deaton et al. |
| 5,644,723 A | 7/1997 | Deaton et al. |
| 5,649,114 A | 7/1997 | Deaton et al. |
| 5,650,604 A | 7/1997 | Marcous et al. |
| 5,659,469 A | 8/1997 | Deaton et al. |
| 5,659,740 A | 8/1997 | Ezaki et al. |
| 5,675,662 A | 10/1997 | Deaton et al. |
| 5,687,322 A | 11/1997 | Deaton et al. |
| 5,689,100 A | 11/1997 | Carrithers et al. |
| 5,703,795 A | 12/1997 | Mankovitz |
| 5,708,782 A | 1/1998 | Larson et al. |
| 5,710,886 A | 1/1998 | Christensen et al. |
| 5,715,448 A | 2/1998 | Suzuki et al. |
| 5,731,980 A | 3/1998 | Dolan et al. |
| 5,732,398 A | 3/1998 | Tagawa |
| 5,734,838 A | 3/1998 | Robinson et al. |
| 5,736,721 A | 4/1998 | Swartz |
| 5,745,555 A | 4/1998 | Mark |
| 5,759,101 A | 6/1998 | Von Kohorn |
| 5,767,896 A | 6/1998 | Nemirofsky |
| 5,789,732 A | 8/1998 | Mcmahon et al. |
| 5,791,991 A | 8/1998 | Small |
| 5,799,767 A | 9/1998 | Molbak |
| 5,805,719 A | 9/1998 | Pare et al. |
| 5,806,044 A | 9/1998 | Powell |
| 5,819,239 A | 10/1998 | Berson et al. |
| 5,821,512 A | 10/1998 | O'Hagan et al. |
| 5,822,735 A | 10/1998 | De Lapa et al. |
| 5,822,744 A | 10/1998 | Kesel |
| 5,832,457 A | 11/1998 | O'Brien et al. |
| 5,832,458 A | 11/1998 | Jones |
| 5,838,812 A | 11/1998 | Pare et al. |
| 5,841,870 A | 11/1998 | Fieres et al. |
| 5,845,259 A | 12/1998 | West et al. |
| 5,845,265 A | 12/1998 | Woolston |
| 5,852,813 A | 12/1998 | Guenther et al. |
| 5,855,007 A | 12/1998 | Jovicic et al. |
| 5,855,369 A | 1/1999 | Lieberman |
| 5,855,514 A | 1/1999 | Kamille |
| 5,857,175 A | 1/1999 | Day et al. |
| 5,859,414 A | 1/1999 | Grimes et al. |
| 5,865,470 A | 2/1999 | Thompson |
| 5,870,723 A | 2/1999 | Pare et al. |
| 5,873,069 A | 2/1999 | Reuhl et al. |
| 5,880,449 A | 3/1999 | Teicher et al. |
| 5,884,278 A | 3/1999 | Powell |
| 5,887,271 A | 3/1999 | Powell |
| 5,892,827 A | 4/1999 | Beach et al. |
| 5,895,902 A | 4/1999 | Ziarno |
| 5,905,246 A | 5/1999 | Fajkowski |
| 5,907,350 A | 5/1999 | Nemirofsky |
| 5,916,024 A | 6/1999 | Von Kohorn |
| 5,917,168 A | 6/1999 | Nakamura et al. |
| 5,918,213 A | 6/1999 | Bernard et al. |
| 5,923,016 A | 7/1999 | Fredregill et al. |
| 5,924,080 A | 7/1999 | Johnson |
| 5,926,795 A | 7/1999 | Williams |
| 5,926,796 A | 7/1999 | Walker et al. |
| 5,931,467 A | 8/1999 | Kamille |
| 5,943,424 A | 8/1999 | Berger et al. |
| 5,948,040 A | 9/1999 | Delorme et al. |
| 5,950,173 A | 9/1999 | Perkowski |
| 5,953,047 A | 9/1999 | Nemirofsky |
| 5,953,705 A | 9/1999 | Oneda |
| 5,956,695 A | 9/1999 | Carrithers et al. |
| 5,967,844 A | 10/1999 | Doutrich et al. |
| 5,970,469 A | 10/1999 | Scroggie et al. |
| 5,970,470 A | 10/1999 | Walker et al. |
| 5,974,396 A | 10/1999 | Anderson et al. |
| 5,978,013 A | 11/1999 | Jones et al. |
| 5,979,757 A | 11/1999 | Tracy et al. |
| 5,988,346 A | 11/1999 | Tedesco et al. |
| 5,992,570 A | 11/1999 | Walter et al. |
| 5,992,888 A | 11/1999 | North et al. |
| 6,000,608 A | 12/1999 | Dorf |
| 6,009,411 A | 12/1999 | Kepecs |
| 6,012,038 A | 1/2000 | Powell |
| 6,012,039 A | 1/2000 | Hoffman et al. |
| 6,014,634 A | 1/2000 | Scroggie et al. |
| 6,016,255 A | 1/2000 | Bolan et al. |
| 6,021,362 A | 2/2000 | Maggard et al. |
| 6,023,688 A | 2/2000 | Ramachandran et al. |
| 6,024,288 A | 2/2000 | Gottlich et al. |
| 6,026,387 A | 2/2000 | Kesel |
| 6,028,920 A | 2/2000 | Carson |
| 6,032,127 A | 2/2000 | Schkolnick et al. |
| 6,035,280 A | 3/2000 | Christensen |
| 6,038,549 A | 3/2000 | Davis et al. |
| 6,039,244 A | 3/2000 | Finsterwald |
| 6,048,271 A | 4/2000 | Barcelou |
| 6,055,513 A | 4/2000 | Katz et al. |
| 6,076,068 A | 6/2000 | Delapa et al. |
| 6,105,013 A | 8/2000 | Curry et al. |
| 6,110,041 A | 8/2000 | Walker et al. |
| 6,116,402 A | 9/2000 | Beach et al. |
| 6,116,505 A | 9/2000 | Withrow |
| 6,125,349 A | 9/2000 | Maher |
| 6,129,346 A | 10/2000 | Zorn |
| 6,138,105 A | 10/2000 | Walker et al. |
| 6,138,911 A | 10/2000 | Fredregill et al. |
| 6,161,059 A | 12/2000 | Tedesco et al. |
| 6,185,545 B1 | 2/2001 | Resnick et al. |
| 6,189,787 B1 | 2/2001 | Dorf |
| 6,199,753 B1 | 3/2001 | Tracy et al. |
| 6,230,143 B1 | 5/2001 | Simons et al. |
| 6,233,564 B1 | 5/2001 | Schulze, Jr. |
| 6,237,145 B1 | 5/2001 | Narasimhan et al. |
| 6,251,017 B1 | 6/2001 | Leason et al. |
| 6,266,647 B1 | 7/2001 | Fernandez |
| 6,276,724 B1 | 8/2001 | Zorn |
| 6,292,785 B1 | 9/2001 | Mcevoy et al. |
| 6,292,786 B1 | 9/2001 | Deaton et al. |
| 6,306,035 B1 | 10/2001 | Kelly et al. |
| 6,308,893 B1 | 10/2001 | Waxelbaum et al. |
| 6,311,896 B1 | 11/2001 | Mulla et al. |
| 6,314,519 B1 | 11/2001 | Davis et al. |
| 6,321,208 B1 | 11/2001 | Barnett et al. |
| 6,327,594 B1 | 12/2001 | Van et al. |
| 6,330,543 B1 | 12/2001 | Kepecs |
| 6,332,128 B1 | 12/2001 | Nicholson |
| 6,334,108 B1 | 12/2001 | Deaton et al. |
| 6,336,099 B1 | 1/2002 | Barnett et al. |
| 6,351,735 B1 | 2/2002 | Deaton et al. |

(56) References Cited

U.S. PATENT DOCUMENTS

| | | |
|---|---|---|
| 6,356,877 B1 | 3/2002 | Schulden et al. |
| 6,363,351 B1 | 3/2002 | Moro |
| 6,366,682 B1 | 4/2002 | Hoffman et al. |
| 6,377,935 B1 | 4/2002 | Deaton et al. |
| 6,386,323 B1 | 5/2002 | Ramachandran et al. |
| 6,394,341 B1 | 5/2002 | Mäkip et al. |
| 6,394,907 B1 | 5/2002 | Rowe |
| 6,397,198 B1 | 5/2002 | Hoffman et al. |
| 6,402,030 B1 | 6/2002 | Summers et al. |
| 6,408,286 B1 | 6/2002 | Heiden |
| 6,424,949 B1 | 7/2002 | Deaton et al. |
| 6,456,980 B1 | 9/2002 | Powell |
| 6,466,921 B1 | 10/2002 | Cordery et al. |
| 6,467,684 B2 | 10/2002 | Fite et al. |
| 6,467,686 B1 | 10/2002 | Guthrie et al. |
| 6,493,110 B1 | 12/2002 | Roberts |
| 6,493,724 B1 | 12/2002 | Cusack et al. |
| 6,496,804 B2 | 12/2002 | McEvoy et al. |
| 6,497,360 B1 | 12/2002 | Schulze, Jr. |
| 6,508,398 B1 | 1/2003 | Estes |
| 6,722,473 B1 | 4/2004 | Ramachandran et al. |
| 6,748,365 B1 | 6/2004 | Quinlan et al. |
| 6,749,240 B1 | 6/2004 | Burr et al. |
| 6,758,393 B1 | 7/2004 | Luciano et al. |
| 6,766,301 B1 | 7/2004 | Daniel et al. |
| 6,769,010 B1 | 7/2004 | Knapp et al. |
| 6,778,967 B1 | 8/2004 | Nicholson |
| 6,779,722 B1 | 8/2004 | Mason |
| 6,795,707 B2 | 9/2004 | Martin et al. |
| 6,810,385 B1 | 10/2004 | Brady et al. |
| 6,829,596 B1 | 12/2004 | Frazee |
| 6,837,436 B2 | 1/2005 | Swartz et al. |
| 6,850,901 B1 | 2/2005 | Charles et al. |
| 6,852,031 B1 | 2/2005 | Rowe |
| 6,862,575 B1 | 3/2005 | Anttila et al. |
| 6,868,406 B1 | 3/2005 | Ogg et al. |
| 6,876,978 B1 | 4/2005 | Walker et al. |
| 6,882,442 B2 | 4/2005 | Roberts |
| 6,885,994 B1 | 4/2005 | Scroggie et al. |
| 6,886,748 B1 | 5/2005 | Moore |
| 6,892,180 B1 | 5/2005 | Pointeau et al. |
| 6,901,374 B1 | 5/2005 | Himes |
| 6,901,436 B1 | 5/2005 | Schneider |
| 6,915,271 B1 | 7/2005 | Meyer et al. |
| 6,925,441 B1 | 8/2005 | Jones, III et al. |
| 6,932,270 B1 | 8/2005 | Fajkowski |
| 6,937,995 B1 | 8/2005 | Kepecs |
| 6,954,732 B1 | 10/2005 | Delapa et al. |
| 6,957,186 B1 | 10/2005 | Guheen et al. |
| 6,959,286 B2 | 10/2005 | Perkowski |
| 6,961,712 B1 | 11/2005 | Perkowski |
| 6,961,713 B2 | 11/2005 | Perkowski |
| 6,965,872 B1 | 11/2005 | Grdina |
| 6,969,318 B1 | 11/2005 | Packes et al. |
| 6,970,852 B1 | 11/2005 | Sendo et al. |
| 6,975,937 B1 | 12/2005 | Kantarjiev et al. |
| 6,978,380 B1 | 12/2005 | Husain et al. |
| 6,980,670 B1 | 12/2005 | Hoffman et al. |
| 6,985,452 B2 | 1/2006 | Marshall et al. |
| 6,985,608 B2 | 1/2006 | Hoffman et al. |
| 6,993,498 B1 | 1/2006 | Deaton et al. |
| 6,999,943 B1 | 2/2006 | Johnson et al. |
| 7,003,495 B1 | 2/2006 | Burger et al. |
| 7,003,500 B1 | 2/2006 | Driessen |
| 7,006,983 B1 | 2/2006 | Packes et al. |
| 7,010,498 B1 | 3/2006 | Berstis |
| 7,013,286 B1 | 3/2006 | Aggarwal et al. |
| 7,016,860 B2 | 3/2006 | Modani et al. |
| 7,016,862 B1 | 3/2006 | Vassigh et al. |
| 7,024,374 B1 | 4/2006 | Day et al. |
| 7,031,945 B1 | 4/2006 | Donner |
| 7,043,441 B1 | 5/2006 | Maher |
| 7,047,205 B2 | 5/2006 | Hale et al. |
| 7,052,393 B1 | 5/2006 | Schoen |
| 7,054,830 B1 | 5/2006 | Eggleston et al. |
| 7,054,837 B2 | 5/2006 | Hoffman et al. |
| 7,058,596 B1 | 6/2006 | Wojcik et al. |
| 7,063,263 B2 | 6/2006 | Swartz et al. |
| 7,065,559 B1 | 6/2006 | Weiss |
| 7,068,382 B1 | 6/2006 | Silverbrook et al. |
| 7,089,199 B2 | 8/2006 | Perkowski |
| 7,089,322 B1 | 8/2006 | Stallmann |
| 7,107,221 B1 | 9/2006 | Tracy et al. |
| 7,107,231 B1 | 9/2006 | Hall et al. |
| 7,117,183 B2 | 10/2006 | Blair et al. |
| 7,120,596 B2 | 10/2006 | Hoffman et al. |
| 7,120,607 B2 | 10/2006 | Bolle et al. |
| 7,124,101 B1 | 10/2006 | Mikurak |
| 7,127,236 B2 | 10/2006 | Khan et al. |
| 7,130,807 B1 | 10/2006 | Mikurak |
| 7,143,055 B1 | 11/2006 | Perkowski |
| 7,150,028 B1 | 12/2006 | Ranta |
| 7,152,040 B1 | 12/2006 | Hawthorne et al. |
| 7,162,454 B1 | 1/2007 | Donner et al. |
| 7,165,041 B1 | 1/2007 | Guheen et al. |
| 7,168,617 B2 | 1/2007 | Walker et al. |
| 7,178,720 B1 | 2/2007 | Strubbe et al. |
| 7,185,809 B2 | 3/2007 | Barton et al. |
| 7,188,138 B1 | 3/2007 | Schneider |
| 7,203,665 B2 | 4/2007 | Donner |
| 7,216,109 B1 | 5/2007 | Donner |
| 7,216,110 B1 | 5/2007 | Ogg et al. |
| 7,231,357 B1 | 6/2007 | Shanman et al. |
| 7,233,913 B2 | 6/2007 | Scroggie et al. |
| 7,236,956 B1 | 6/2007 | Ogg et al. |
| 7,240,023 B1 | 7/2007 | Powell |
| 7,240,037 B1 | 7/2007 | Bussell |
| 7,246,158 B2 | 7/2007 | Kitada et al. |
| 7,248,719 B2 | 7/2007 | Hoffman et al. |
| 7,249,096 B1 | 7/2007 | Lasater et al. |
| 7,257,545 B1 | 8/2007 | Hung |
| 7,263,507 B1 | 8/2007 | Francis et al. |
| 7,267,614 B1 | 9/2007 | Jorasch et al. |
| 7,277,866 B1 | 10/2007 | Or-Bach et al. |
| 7,280,975 B1 | 10/2007 | Donner |
| 7,280,979 B1 | 10/2007 | Katz et al. |
| 7,283,650 B1 | 10/2007 | Sharma et al. |
| 7,283,974 B2 | 10/2007 | Katz et al. |
| 7,292,999 B2 | 11/2007 | Hobson et al. |
| 7,296,282 B1 | 11/2007 | Koplar et al. |
| 7,306,141 B1 | 12/2007 | Schwarz, Jr. |
| 7,308,254 B1 | 12/2007 | Rissanen |
| 7,311,244 B1 | 12/2007 | Schwarz, Jr. |
| 7,315,826 B1 | 1/2008 | Guheen et al. |
| 7,318,041 B2 | 1/2008 | Walker et al. |
| 7,319,987 B1 | 1/2008 | Ned et al. |
| 7,330,974 B1 | 2/2008 | Silverbrook et al. |
| 7,334,728 B2 | 2/2008 | Williams |
| 7,340,439 B2 | 3/2008 | Burger et al. |
| 7,343,350 B1 | 3/2008 | Donner |
| 7,349,668 B2 | 3/2008 | Ilan et al. |
| 7,357,311 B2 | 4/2008 | Silverbrook et al. |
| 7,357,312 B2 | 4/2008 | Gangi |
| 7,364,068 B1 | 4/2008 | Strubbe et al. |
| 7,364,086 B2 | 4/2008 | Mesaros |
| 7,367,500 B2 | 5/2008 | Fajkowski |
| 7,376,580 B1 | 5/2008 | Walker et al. |
| 7,377,421 B2 | 5/2008 | Rhoads |
| 7,379,891 B1 | 5/2008 | Donner et al. |
| 7,380,709 B2 | 6/2008 | Silverbrook et al. |
| 7,386,485 B1 | 6/2008 | Mussman et al. |
| 7,386,517 B1 | 6/2008 | Donner |
| 7,396,281 B2 | 7/2008 | Mendelsohn et al. |
| 7,398,225 B2 | 7/2008 | Voltmer et al. |
| 7,400,932 B2 | 7/2008 | Ackley et al. |
| 7,403,796 B2 | 7/2008 | Silverbrook et al. |
| 7,406,436 B1 | 7/2008 | Reisman |
| 7,407,092 B2 | 8/2008 | Silverbrook et al. |
| 7,412,409 B2 | 8/2008 | Aliabadi et al. |
| 7,415,424 B1 | 8/2008 | Donner |
| 7,415,443 B2 | 8/2008 | Hobson et al. |
| 7,428,498 B2 | 9/2008 | Voltmer et al. |
| 7,428,986 B2 | 9/2008 | Silverbrook et al. |
| 7,438,215 B2 | 10/2008 | Silverbrook et al. |

(56) References Cited

U.S. PATENT DOCUMENTS

| | | |
|---|---|---|
| 7,441,697 B2 | 10/2008 | Fletcher |
| 7,441,710 B2 | 10/2008 | Perkowski |
| 7,441,712 B2 | 10/2008 | Silverbrook et al. |
| 7,448,538 B2 | 11/2008 | Fletcher |
| 7,455,586 B2 | 11/2008 | Nguyen et al. |
| 7,464,050 B1 | 12/2008 | Deaton et al. |
| 7,469,829 B2 | 12/2008 | Silverbrook et al. |
| 7,472,827 B2 | 1/2009 | Fletcher |
| 7,490,065 B1 | 2/2009 | Ogg et al. |
| 7,496,524 B2 | 2/2009 | Voltmer et al. |
| 7,496,527 B2 | 2/2009 | Silverstein et al. |
| 7,506,168 B2 | 3/2009 | Silverbrook et al. |
| 7,515,914 B2 | 4/2009 | Herrod et al. |
| 7,516,886 B2 | 4/2009 | Gangi |
| 7,529,713 B1 | 5/2009 | Donner |
| 7,533,810 B2 | 5/2009 | Walker et al. |
| 7,534,169 B2 | 5/2009 | Amaitis et al. |
| 7,536,034 B2 | 5/2009 | Rhoads et al. |
| 7,537,153 B2 | 5/2009 | Harlan et al. |
| 7,540,408 B2 | 6/2009 | Levine et al. |
| 7,546,257 B2 | 6/2009 | Hoffman et al. |
| 7,562,028 B1 | 7/2009 | Donner |
| 7,562,051 B1 | 7/2009 | Donner |
| 7,565,328 B1 | 7/2009 | Donner |
| 7,567,940 B1 | 7/2009 | Engelberg et al. |
| 7,575,172 B2 | 8/2009 | Silverbrook et al. |
| 7,577,575 B1 | 8/2009 | Donner et al. |
| 7,577,619 B1 | 8/2009 | Donner et al. |
| 7,577,620 B1 | 8/2009 | Donner |
| 7,580,856 B1 | 8/2009 | Pliha |
| 7,584,133 B2 | 9/2009 | Horowitz |
| 7,584,134 B2 | 9/2009 | Horowitz |
| 7,584,139 B2 | 9/2009 | Goodwin et al. |
| 7,590,589 B2 | 9/2009 | Hoffberg |
| 7,591,724 B2 | 9/2009 | Baerlocher |
| 7,593,871 B1 | 9/2009 | Mesaros |
| 7,593,883 B2 | 9/2009 | Horowitz |
| 7,597,250 B2 | 10/2009 | Finn |
| 7,599,857 B2 | 10/2009 | Bishop et al. |
| 7,606,730 B2 | 10/2009 | Antonucci |
| 7,606,741 B2 | 10/2009 | King et al. |
| 7,613,628 B2 | 11/2009 | Ariff et al. |
| 7,617,159 B1 | 11/2009 | Donner |
| 7,620,475 B1 | 11/2009 | Bottazzi et al. |
| 7,621,442 B2 | 11/2009 | Silverbrook et al. |
| 7,627,499 B2 | 12/2009 | Hahn-Carlson |
| 7,637,810 B2 | 12/2009 | Amaitis |
| 7,646,503 B2 | 1/2010 | Silverbrook |
| 7,658,327 B2 | 2/2010 | Tuchman |
| 7,658,674 B2 | 2/2010 | Walker |
| 7,660,581 B2 | 2/2010 | Ramer |
| 7,663,789 B2 | 2/2010 | Silverbrook |
| 7,673,315 B1 | 3/2010 | Wong |
| 7,677,445 B2 | 3/2010 | Silverbrook |
| 7,681,800 B2 | 3/2010 | Silverbrook |
| 7,685,083 B2 | 3/2010 | Fairweather |
| 7,689,302 B2 | 3/2010 | Schlottmann |
| 7,689,473 B2 | 3/2010 | Borom |
| 7,693,766 B2 | 4/2010 | Horowitz |
| 7,702,318 B2 | 4/2010 | Ramer |
| 7,702,918 B2 | 4/2010 | Tattan |
| 7,706,838 B2 | 4/2010 | Atsmon |
| 7,711,598 B2 | 5/2010 | Perkowski |
| 7,716,077 B1 | 5/2010 | Mikurak |
| 7,716,080 B2 | 5/2010 | Postrel |
| 7,720,718 B2 | 5/2010 | Hale |
| 7,729,925 B2 | 6/2010 | Maritzen |
| 7,729,945 B2 | 6/2010 | Katz |
| 7,735,726 B2 | 6/2010 | Bjoraker |
| 7,739,162 B1 | 6/2010 | Pettay |
| 7,742,755 B2 | 6/2010 | Silverbrook |
| 7,747,280 B2 | 6/2010 | Silverbrook |
| 7,752,141 B1 | 7/2010 | Ogg |
| 7,753,259 B1 | 7/2010 | Taylor |
| 7,761,338 B1 | 7/2010 | Schneider |
| 7,762,470 B2 | 7/2010 | Finn |
| 7,762,885 B2 | 7/2010 | Kelly |
| 7,771,271 B2 | 8/2010 | Walker |
| 7,774,231 B2 | 8/2010 | Pond |
| 7,774,274 B2 | 8/2010 | Jones |
| 7,778,920 B2 | 8/2010 | Zarin |
| 7,780,526 B2 | 8/2010 | Nguyen |
| 7,783,532 B2 | 8/2010 | Hsu et al. |
| 7,783,542 B2 | 8/2010 | Horowitz |
| 7,783,543 B2 | 8/2010 | Horowitz |
| 7,783,544 B2 | 8/2010 | Horowitz |
| 7,783,566 B2 | 8/2010 | Armes |
| 7,784,681 B2 | 8/2010 | Silverbrook |
| 7,784,682 B2 | 8/2010 | Taylor |
| 7,788,129 B2 | 8/2010 | Antonucci |
| 7,788,188 B2 | 8/2010 | Kramer |
| 7,792,298 B2 | 9/2010 | Silverbrook |
| 7,792,539 B2 | 9/2010 | Inselberg |
| 7,792,702 B1 | 9/2010 | Katz |
| 7,796,162 B2 | 9/2010 | Ortiz |
| 7,797,005 B2 | 9/2010 | Inselberg |
| 7,797,021 B2 | 9/2010 | Silverbrook |
| 7,798,397 B2 | 9/2010 | Henry |
| 7,801,629 B2 | 9/2010 | Hale |
| 7,812,935 B2 | 10/2010 | Cowburn |
| 7,813,955 B2 | 10/2010 | Ariff |
| 7,815,114 B2 | 10/2010 | Mesaros |
| 7,818,215 B2 | 10/2010 | King |
| 7,818,392 B1 | 10/2010 | Martino |
| 7,818,415 B2 | 10/2010 | Jhanji |
| 7,822,635 B1 | 10/2010 | Brown |
| 7,822,647 B1 | 10/2010 | Mussman |
| 7,828,208 B2 | 11/2010 | Gangi |
| 7,833,101 B2 | 11/2010 | Lutnick |
| 7,840,485 B1 | 11/2010 | Warren |
| 7,843,595 B2 | 11/2010 | Silverbrook |
| 7,843,596 B2 | 11/2010 | Silverbrook |
| 7,844,492 B2 | 11/2010 | Perkowski |
| 7,845,555 B2 | 12/2010 | Walker |
| 7,853,241 B1 | 12/2010 | Harrison |
| 7,854,386 B2 | 12/2010 | Silverbrook |
| 7,855,805 B2 | 12/2010 | Silverbrook |
| 7,856,360 B2 | 12/2010 | Kramer |
| 7,856,368 B2 | 12/2010 | Avallone |
| 7,856,377 B2 | 12/2010 | Cohagan |
| 7,856,414 B2 | 12/2010 | Zee |
| 7,860,871 B2 | 12/2010 | Ramer |
| 7,865,187 B2 | 1/2011 | Ramer |
| 7,865,447 B2 | 1/2011 | Rosenhaft |
| 7,870,022 B2 | 1/2011 | Bous |
| 7,873,547 B2 | 1/2011 | Borom |
| 7,873,579 B2 | 1/2011 | Hobson |
| 7,873,580 B2 | 1/2011 | Hobson |
| 7,881,965 B2 | 2/2011 | Bowles |
| 7,882,032 B1 | 2/2011 | Hoffman |
| 7,890,367 B2 | 2/2011 | Senghore |
| 7,899,710 B1 | 3/2011 | Walker |
| 7,903,029 B2 | 3/2011 | Dupray |
| 7,907,940 B2 | 3/2011 | Ramer |
| 7,908,237 B2 | 3/2011 | Angell |
| 8,065,201 B2 | 11/2011 | Perkowski |
| 8,260,663 B1 | 9/2012 | Ranka et al. |
| 8,352,323 B2 | 1/2013 | Fisher |
| 8,386,309 B2 | 2/2013 | Thibedeau et al. |
| 2002/0065720 A1 | 5/2002 | Carswell et al. |
| 2003/0055727 A1 | 3/2003 | Walker et al. |
| 2003/0088462 A1 | 5/2003 | Carrithers et al. |
| 2003/0163373 A1 | 8/2003 | Cornateanu |
| 2003/0220835 A1 | 11/2003 | Barnes, Jr. |
| 2004/0010597 A1 | 1/2004 | Kirschner et al. |
| 2004/0024638 A1 | 2/2004 | Restis |
| 2004/0030598 A1 | 2/2004 | Boal |
| 2004/0117250 A1 | 6/2004 | Lubow et al. |
| 2004/0128197 A1 | 7/2004 | Bam et al. |
| 2004/0238622 A1 | 12/2004 | Freiberg |
| 2005/0108096 A1 | 5/2005 | Burger et al. |
| 2005/0165682 A1 | 7/2005 | Duke |
| 2005/0240478 A1 | 10/2005 | Lubow et al. |
| 2006/0169764 A1 | 8/2006 | Ross et al. |

(56) References Cited

U.S. PATENT DOCUMENTS

| | | | |
|---|---|---|---|
| 2007/0005427 A1 | 1/2007 | Walker et al. | |
| 2007/0017976 A1 | 1/2007 | Peyret et al. | |
| 2007/0073589 A1 | 3/2007 | Vergeyle et al. | |
| 2007/0094080 A1 | 4/2007 | Wiken | |
| 2007/0215696 A1 | 9/2007 | Macnish | |
| 2007/0228157 A1 | 10/2007 | Eckert | |
| 2007/0288372 A1 | 12/2007 | Behar et al. | |
| 2008/0010200 A1 | 1/2008 | Smith et al. | |
| 2008/0011837 A1 | 1/2008 | Wesley | |
| 2008/0059303 A1 | 3/2008 | Fordyce | |
| 2008/0065490 A1 | 3/2008 | Novick et al. | |
| 2008/0067232 A1 | 3/2008 | Whytock et al. | |
| 2008/0077486 A1 | 3/2008 | Davis et al. | |
| 2008/0120155 A1 | 5/2008 | Pliha | |
| 2008/0147504 A1 | 6/2008 | Suk | |
| 2008/0154676 A1 | 6/2008 | Suk | |
| 2008/0177624 A9 | 7/2008 | Dohse | |
| 2008/0257958 A1 | 10/2008 | Rothwell et al. | |
| 2008/0262928 A1 | 10/2008 | Michaelis | |
| 2008/0270243 A1 | 10/2008 | Lewis et al. | |
| 2009/0005146 A9 | 1/2009 | Kelly et al. | |
| 2009/0005152 A9 | 1/2009 | Kelly et al. | |
| 2009/0005158 A9 | 1/2009 | Kelly et al. | |
| 2009/0005170 A9 | 1/2009 | Kelly et al. | |
| 2009/0006203 A1 | 1/2009 | Fordycle et al. | |
| 2009/0076934 A1 | 3/2009 | Shahbazi et al. | |
| 2009/0119174 A1 | 5/2009 | Pfister | |
| 2009/0144164 A1 | 6/2009 | Wane et al. | |
| 2009/0150211 A1 | 6/2009 | Bayne | |
| 2009/0150265 A1 | 6/2009 | Keld | |
| 2009/0182630 A1 | 7/2009 | Otto et al. | |
| 2009/0186699 A9 | 7/2009 | Kelly | |
| 2009/0259541 A1 | 10/2009 | Morrison, Jr. | |
| 2009/0313109 A1 | 12/2009 | Bous et al. | |
| 2010/0070359 A1 | 3/2010 | Heasley et al. | |
| 2010/0088166 A1 | 4/2010 | Tollinger | |
| 2010/0094701 A1 | 4/2010 | Ghosh et al. | |
| 2010/0122274 A1 | 5/2010 | Gillies et al. | |
| 2010/0145784 A1 | 6/2010 | Sriver et al. | |
| 2010/0153205 A1 | 6/2010 | Retter et al. | |
| 2010/0293099 A1 | 11/2010 | Pauker et al. | |
| 2010/0299195 A1 | 11/2010 | Nix et al. | |
| 2011/0029364 A1 | 2/2011 | Roeding et al. | |
| 2011/0029368 A1* | 2/2011 | Hsu | G06Q 10/087 705/14.26 |
| 2011/0057027 A1 | 3/2011 | Grossman et al. | |
| 2011/0060631 A1 | 3/2011 | Grossman et al. | |
| 2011/0060634 A1 | 3/2011 | Grossman et al. | |
| 2011/0060636 A1 | 3/2011 | Grossman et al. | |
| 2011/0060641 A1 | 3/2011 | Grossman et al. | |
| 2011/0060691 A1 | 3/2011 | Grossman et al. | |
| 2011/0082729 A1 | 4/2011 | Carvallo et al. | |
| 2011/0093318 A1* | 4/2011 | Guday | G06Q 30/00 705/14.13 |
| 2011/0093326 A1 | 4/2011 | Bous et al. | |
| 2011/0320255 A1 | 12/2011 | Gorowitz et al. | |
| 2012/0130785 A1* | 5/2012 | Postrel | G06Q 30/02 705/14.17 |
| 2012/0284107 A1 | 11/2012 | Gernaat et al. | |
| 2012/0316949 A1 | 12/2012 | Chen | |

OTHER PUBLICATIONS

The M-Voucher Solution, Oct. 2006, 1-19, Eagle Eye Solutions, USA.

Stacia Levenfeld, Product Jump 71% on Average with EZ-PIC TM Paperless, In-Store Coupons, Jan. 7, 2008, Chicago, IL.

Paperless Coupon Pilot Boosts Sales 71% at Big Y, Jan. 8, 2008, Progressive Grocer, Springfield, Mass.

Forecasts for Management DecisionMaking, Feb. 1, 2008(as downloaded by http://gsearch.kiplinger.com/search?q=tired+of+clipping+&entqr=0&output=xml_no_dtd&sort=date%3AD%3AL%3Ad1&client=default_frontend&ud=1&oe=UTF-8&ie=UTF-8&proxystylesheet=redesign_frontend&site=default_collection), vol. 85, No. 5, The Kiplinger Letter, Washington, DC.

Stacia Levenfeld, EZ-PIC Paperless, Instant Coupons Offers Environmentally Sound Couponing, Mar. 24, 2008, Chicago, IL.

Stacia Levenfeld, EZ-PIC Paperless Coupons Help Customers Save Amid Rising Food Prices, Jun. 5, 2008, Chicago, IL.

Stacia Levenfeld, Meijer, Stater Bros., Ukrop's, and United Supermarkets begin offering EZ-PIC Paperless Coupons, Jul. 1, 2008, Chicago, IL.

Todd Rogers, Stacia Levenfeld, Paperless Coupons: BI-LO Offers One More Way to Save This Summer, Jul. 2, 2008, Mauldin, SC.

UCoupon, Downloaded on Sep. 20, 2010,You Technology, USA.

FAQ, Downloaded on Sep. 20, 2010, Zavers, USA.

International Search Report for International Application PCT/US10/45980, dated Sep. 28, 2010.

International Search Report for International Application PCT/US10/45983, dated Oct. 12, 2010.

International Search Report for International Application PCT/US10/46080, dated Sep. 24, 2010.

International Search Report for International Application PCT/US10/46085, dated Sep. 24, 2010.

International Search Report for International Application PCT/US10/46416, dated Oct. 1, 2010.

International Search Report for International Application PCT/US10/46418, dated Sep. 27, 2010.

"Card Linked Offers (CLOs)—Loyalty 2.0" (http://clovrmedia.com/financial-institutions/), Clovr Media Inc., Boston, MA, 2010.

"WSJ: Google teams with MasterCard and Citigroup for NFC payments, also files patent app" (http://engadget.com/2011/03/27/google-teams-with-mastercard-and citigroup -for-nfc . . . ), Aol Inc., New York, NY, Mar. 27, 2011.

"VeriFone puts money near mouth, says it'll include NFC in all new POS terminals" (http://engadget.com/2011/03/07/verifone-puts-money-near-mouth-says-itll-include-nf . . . ), Aol Inc., New York, NY, Mar. 7, 2011.

"American Express challenges PayPal with 'Serve' digital platform" (http://engadget.com/2011/03/28/american-express-challenges-p . . . ), Aol Inc., New York, NY, Mar. 28, 2011.

\* cited by examiner

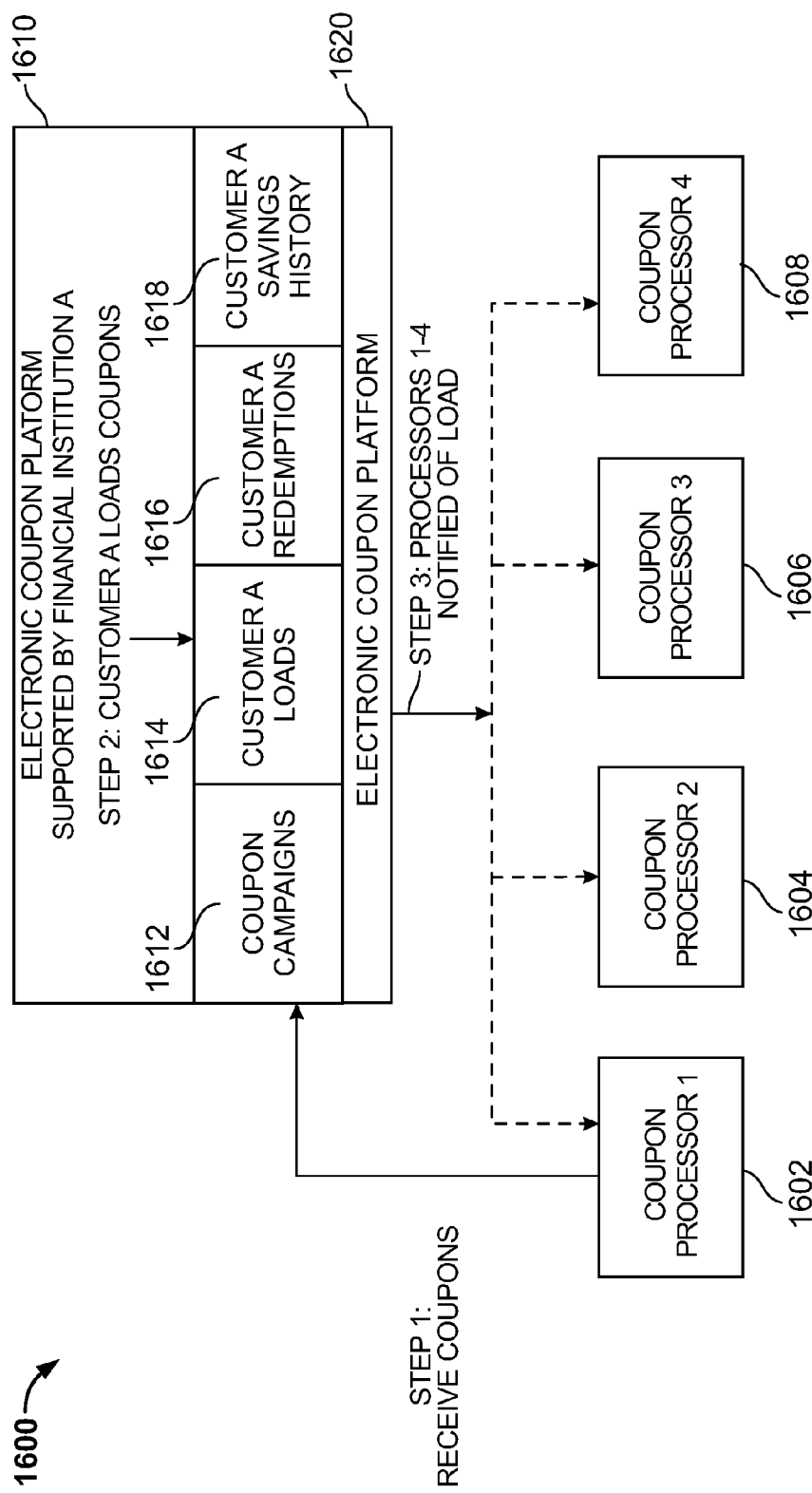

US 9,892,419 B1

COUPON DEPOSIT ACCOUNT FRAUD PROTECTION SYSTEM

FIELD OF TECHNOLOGY

Aspects of the disclosure relate to electronic coupon processing. In particular, the disclosure relates to processing electronic coupon offers at, or in association with, an electronic transaction at a point of sale terminal.

BACKGROUND

One type of coupon is a discount offer. Such a coupon may function like cash and be applied toward payment for customer goods at a point of sale terminal.

For manufacturers and retailers, coupons are a tool for product marketing. However, a deterrent to conventional coupon use is the requirement that the customer physically obtain the coupon by either clipping or printing the coupon, carrying the coupon to a retail location and presenting the coupon at a point of sale terminal.

It would be desirable, therefore, to provide apparatus and methods for applying electronic coupons at a point of sale terminal without requiring the physical presentation of the coupon at the point of sale terminal. Such systems and methods may include a coupon processor in electronic communication with a point of sale terminal. The coupon processor may store customer information that includes an electronic coupon electronically selected by a customer. In the event that the customer identifies himself at the point of sale terminal, the coupon processor may be configured to subsequently validate the coupon to the point of sale terminal or, alternatively, instruct the point of sale terminal to redeem the electronic coupon on behalf of the customer.

In the event that a system uses multiple coupon processors to store customer information, a first coupon processor may instruct a point of sale terminal associated with the first coupon processor to redeem an electronic coupon on behalf of the customer. A second coupon processor, however, may be unaware of the electronic coupon redemption. This is undesirable at least because the second coupon processor may subsequently authorize a point of sale terminal associated with the second coupon processor to redeem the electronic coupon that has already been redeemed at the first point of sale terminal.

Thus, it is further desirable to provide systems and methods to enhance a multi-coupon processor environment in order to avoid the double redemption of a single electronic coupon. Such systems and methods may include an electronic coupon platform. The electronic coupon platform may be in electronic communication with the multiple coupon processors and assist in avoiding the double redemption of a single electronic coupon.

SUMMARY

Systems and methods for redeeming an electronic coupon are provided. The systems and methods may include an electronic coupon platform. The electronic coupon platform may include a receiver module that receives data relating to the redemption of a plurality of electronic coupons by a customer. The data may include an electronic coupon identifier associated with each of the plurality of electronic coupons. Each electronic coupon identifier may be associated with a redemption value. The electronic coupon platform may also include a storage module that stores the data and associates it with the customer. The electronic coupon platform may further include a processor module that initiates a deposit of an amount of funds in a customer bank account associated with the customer at predetermined time intervals. The processor module may electronically calculate the amount of funds. The calculation may include summing the redemption values associated with each distinct electronic coupon identifier included in the stored data.

A method for transmitting electronic coupon information is also provided. The method may include using a receiver module to receive data relating to an electronic coupon selected by a customer via a web-based portal accessible via the internet. In immediate response thereto, the method may further include using a transmitter module to transmit data relating to the customer and the selected electronic coupon to a plurality of coupon processors. Preferably each of the plurality of coupon processors are in electronic communication with one or more point of sale terminals.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 16 is still another flow diagram of a process in accordance with the principles of the invention.

DETAILED DESCRIPTION OF THE INVENTION

Figure 1:
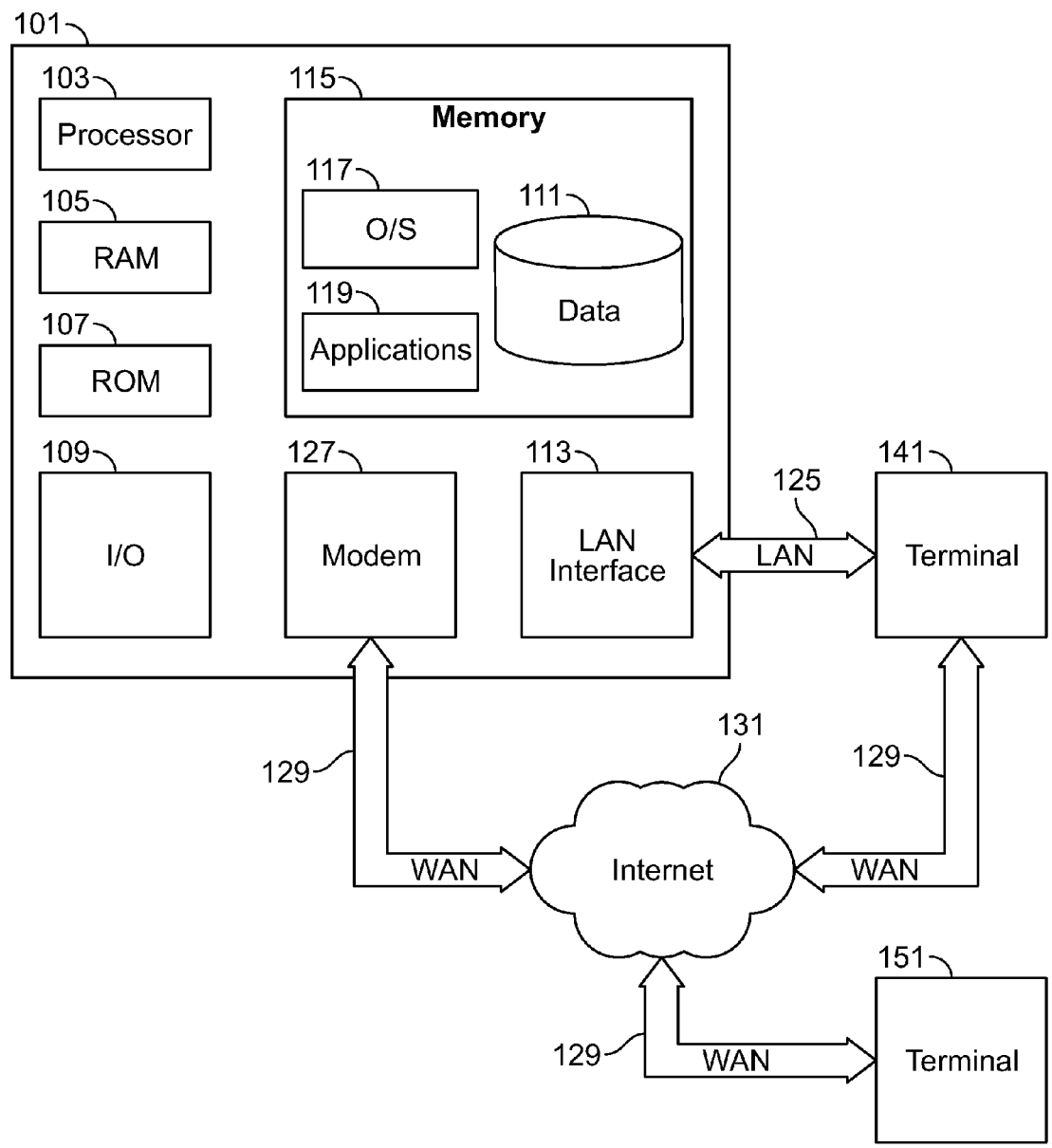
FIG. 1 shows apparatus in accordance with the principles of the invention.

Apparatus and methods for distributing and redeeming electronic coupons are provided. The apparatus and methods may also be applied to vouchers, certificates, awards, incentives, discounts, values and/or any other benefit. The electronic coupons may be provided to a customer in connection with the purchase of one or more goods and/or services.

The systems and methods of the invention may include an electronic coupon platform. The electronic coupon platform may be supported by a financial institution, manufacturer, retailer, or any other suitable party such as an issuer of a loyalty card and/or purchasing instrument account. The electronic coupon platform may receive electronic coupons from one or more offer sources, such as one or more coupon processors. The coupon processors may be associated with one or more retailers, manufacturers and/or loyalty card providers. The coupon processors may be in electronic communication with one or more point of sale (hereinafter, "POS") terminals at one or more merchant locations. The electronic communication may be real-time communication.

The electronic coupon platform may be used for the compilation, publication, storage, display, application and/or settlement of the electronic coupons received from the coupon processors. The electronic coupon platform may display the electronic coupons to multiple customers using an electronic platform, such as a web-based portal. The web-based portal may be supported by, in electronic communication with, and/or an integral part of the electronic coupon platform. Thus, it should be understood that any references herein to an electronic coupon platform or a web-based portal may, in different embodiments, relate to a web-based portal or an electronic coupon platform, or both, respectively.

The web-based portal may be accessed via the internet, a cell phone, a PDA, or any other suitable device that supports an internet connection. In some embodiments, the web-based portal may be accessed via an ATM and/or a kiosk at a participating retailer. In the embodiments wherein the electronic coupon platform is supported by a financial institution, the web-based portal may be accessed using an online banking application provided by the financial institution. Access to the web-based portal may be restricted to enrolled and/or eligible customers. In some embodiments, payment of a one-time or recurring fee may be required for access to the web-based portal.

The web-based portal may enable a customer to associate one or more electronic coupons with one or more payment instruments and/or loyalty cards. The payment instrument may be a credit card, a debit card, a check, a bank card and/or a stored-value card. The payment instrument may also be a bar-coded article, an instrument or device that includes a contactless chip such as an ISO14443-compliant contactless chip, a cell phone, an RFID-based device, a personal data assistant or any other suitable electronic, encoded or information-bearing purchasing device. The loyalty card may be any card provided by one or more merchants and/or retailers to be used for application of coupons.

The customer may be required to enroll in a coupon service prior to accessing electronic coupons offered by the web-based portal. Enrollment may be carried out via an enrollment option included on the web-based portal. Enrollment may include a customer inputting information relating to one or more payment instruments and/or loyalty cards. The customer may input the information relating to the payment instruments and/or loyalty cards by inputting loyalty card and/or payment instrument information into one or more input fields displayed in a graphical user interface (hereinafter, "GUI") included in the web-based portal. In the embodiments wherein the customer chooses to enroll in the coupon service via a kiosk, the customer may swipe a payment instrument and/or a loyalty card to identify the payment instrument and/or loyalty card.

It should be noted that, in the embodiments wherein the payment instrument is a bar-coded article, an instrument or device that includes a contactless chip, a cell phone, an RFID-based device, a personal data assistant or any other suitable electronic, encoded or information-bearing purchasing device, the customer may be required to use the payment instrument to input one or more pieces of information to a point of sale terminal. For example, in the embodiments wherein the payment instrument is a mobile phone that supports near field communication ("NFC") technology, the customer may use the mobile phone's NFC chip to input identification information into a point of sale terminal.

Enrollment may additionally include the customer inputting one or more pieces of customer information, such as customer name, address and/or telephone number, into additional input fields included in the web-based portal. The web-based portal may store the customer data in addition to the payment instrument and/or loyalty card data in a customer profile database. Upon completion of enrollment in the coupon service, the customer may be granted password-secured access to the web-based portal. The password-secured access may enable the customer to view and associate electronic coupons with the enrolled payment instrument(s) and/or loyalty card(s).

In the embodiments wherein the electronic coupon platform is supported by a financial institution, customer enrollment in one or more of a bank account, debit card, credit card, bank mortgage program, and/or any other suitable financial product provided by the financial institution may be sufficient or required to enable a customer to access the electronic coupons offered by the web-based portal. In these embodiments, a customer may select one or more payment instruments with which he desires to associate electronically selected electronic coupons. In some embodiments, the payment instrument(s) may be required to be provided by the financial institution.

Additionally, the customer may be presented with the option to enter information relating to one or more loyalty cards with which he desires to associate electronically selected electronic coupons. In the event that the customer selects payment instruments(s) and/or loyalty card(s) with which to apply the systems and methods of the invention, the customer may initiate the coupons service provided by the financial institution.

It should be noted that, in some of the embodiments wherein the electronic coupon platform is supported by a financial institution, a customer may enroll a payment instrument issued by a financial institution different from the supporting financial institution. Additionally, the customer may not be a customer of the financial institution. In some of these embodiments, the customer may be required to participate in an enrollment process and and/or pay a fee prior to accessing and applying the systems and methods of the invention that are provided by the supporting financial institution.

Upon customer enrollment in or initiation of the coupon service, the customer may view electronic coupons by accessing the web-based portal and viewing one or more web pages. The web-based portal may enable the customer to select one or more of the electronically-displayed electronic coupons. A customer selection of one or more of the electronic coupons and/or selection of a 'submit' or similar icon may prompt the web-based portal to electronically associate the selected electronic coupons with customer identification information and/or the customer's enrolled payment instruments and/or loyalty cards. Data relating to the selected electronic coupons may be stored in a database included in the electronic coupon platform. In some embodiments, subsequent use of the purchasing instrument and/or loyalty card at a point of sale terminal may trigger the application of one or more of the electronic coupons stored on the electronic coupon platform.

The web-based portal may communicate one or more electronic coupon offers to a customer. In these embodiments, the web-based portal may enable the customer to select one or more communication options for the receipt of the electronic coupon offers. Electronic coupon offers may be transmitted to the customer weekly, monthly or on any other appropriate schedule. In addition to, or in place of, the scheduled transmission, individual offers or groups of offers may be transmitted as a special promotion.

For example, in some embodiments, the communication method may involve an email message. The email message may display electronic coupon offers and enable desired offers to be selected. Reminders regarding available offers may also be sent in the email message.

In additional embodiments, the communication method may involve the transmission of an electronic message to a mobile device, such as a text message to a mobile phone. The electronic message may include electronic coupon offers, reminders about available offers or reminders about offers previously selected. The location of the mobile device may prompt the transmission of the electronic message. For example, entering a retail location that participates in the coupon service may trigger the transmission of an electronic message. Furthermore, the presentation of an enrolled customer payment card and/or loyalty card may trigger the transmission of the electronic message. Additionally, an electronic message may be electronically transmitted to a customer in the event that a point of sale terminal, coupon processor and/or electronic coupon platform receives an indication that the customer has presented for purchase goods for which a electronic coupon offer is present in a customer profile to which the customer is linked.

In yet other embodiments, a POS terminal at which a customer presents a purchasing instrument and/or goods to be purchased may display and/or print electronic coupon offer information to the customer.

In further embodiments, electronic coupon offers may be communicated to a customer in conjunction with a regular communication related to a customer loyalty card and/or purchasing instrument. For example, a list of available electronic coupon offers may be appended to a customer bank statement, which may be an electronic statement or a paper copy. In yet other embodiments, a reminder may appear on a receipt printed from an ATM upon the completion of an ATM transaction.

In an exemplary embodiment of the invention, after viewing electronic coupons displayed in the web-based portal, a customer may select one or more electronic coupons. The customer may subsequently select a button, such as a 'SUBMIT' or 'APPLY' button, to verify his selections. The electronic coupon platform may then store information relating to the selected electronic coupons together with customer profile data associated with the customer. The data may be stored in a customer profile database or any other suitable database.

The electronic coupon platform may transmit the selected coupon data to one or more coupon processors. The coupon processors may be coupon processors in electronic communication with one or more point of sale devices configured to redeem at least one of the selected coupons.

The transmitted data may include at least the selected electronic coupons and customer identification information identifying the customer that selected the electronic coupons. It should be noted that, in the event that the electronic coupon platform transmits to a coupon processor data relating to a customer for the first time—e.g., where the customer has selected coupons available to be redeemed by the coupon processor for the first time—the electronic coupon platform may additionally transmit data relating to customer identification information and the payment instrument(s) and/or loyalty card(s) that the customer enrolled in the systems and methods of the invention.

In an alternative embodiment of the invention, the customer may have enrolled at the coupon processor, but not yet transmitted any data to the processor from the platform. In such an embodiment, the electronic coupon platform may also transmit data relating to customer identification information and the payment instrument(s) and/or loyalty card(s) that the customer enrolled with the platform according to the systems and methods of the invention.

The coupon processors that receive the transmitted data may store at least a portion of the data in a database. Upon storage of the data in a database, each of the coupon processors may be configured to inform a POS terminal of one or more electronic coupons available to be redeemed on behalf of the customer. The coupon processors may inform the POS terminal of electronic coupons available to be redeemed on behalf of the customer in the event that the POS terminal transmits identification information that identifies the customer and/or goods that the customer desires to purchase at the POS terminal.

For example, at a POS terminal, goods may be scanned for checkout on behalf of the customer. Any paper coupons may be applied, any merchant loyalty card may be processed, and these discount(s) may be deducted from product prices. Prior to the customer paying for the goods, product identifiers such as stock-keeping unit numbers ("SKUs") and/or Universal Product Codes ("UPCs") may be transmitted to a coupon processor in electronic communication with the POS terminal. Customer payment information and/or loyalty card information may additionally be transmitted to the coupon processor by the POS terminal.

Upon receipt of the data, the coupon processor may determine if the customer payment card information and/or loyalty card information is associated with a stored customer profile. In the event that the coupon processor identifies a customer profile associated with the received card information, the coupon processor may proceed to compare stored coupons included in the identified customer profile to the product SKUs and/or UPCs.

The coupon processor may identify stored coupons included in the customer profile that relate to the product SKUs and/or UPCs. The coupon processor may then update the data associated with the identified electronic coupons to include the redeemed status of the identified stored coupons. In some embodiments, the coupon processor may delete data relating to the identified stored coupons.

Additionally, the coupon processor may transmit the identified coupon information to the POS terminal. The POS terminal may subsequently adjust the customer's purchase price based on the transmitted information. The coupon processor may then transmit to the electronic coupon platform information relating to the identified electronic coupons and the identified customer. Upon receipt of the data from the coupon processor, the electronic coupon platform may modify customer profile data associated with the customer to include the redeemed status of the identified electronic coupon(s).

In other embodiments, the coupon processor may not inform the POS terminal of the coupons available to be redeemed. Rather, the coupon processor may transmit to the electronic coupon platform information relating to the identified electronic coupons and the identified customer. Upon receipt of the data from the coupon processor, the electronic coupon platform may modify customer profile data associated with the customer to include the redeemed status of the electronic coupon(s). Later, the electronic coupon platform may credit the customer for a redemption value associated with the identified electronic coupons. The electronic coupon platform may credit the customer by initiating a deposit of an amount of funds into a customer-specified account, such as a bank account and/or a direct deposit account ("DDA").

It should be noted that the systems and methods of the invention may include filtering electronic coupons offered to a customer based on customer data. The customer data may be drawn from purchasing instrument account information, past purchasing instrument use, previously selected electronic coupon offers, past redeemed electronic coupons or any other appropriate data source. Examples of customer data used to filter electronic coupon offers may include information regarding geographic region, categories of product purchases, specific product purchases and/or shopping history with identified merchants.

Predictive analytics or any other appropriate technique may be a used to analyze the customer data and apply it to the electronic coupon offers. For example, systems and methods for narrowing and selecting compatible electronic coupon offers based on customer data as described in patent application Ser. No. 13/017,103, entitled "Customer Benefit Offer Organization," filed Jan. 31, 2011, the contents of the application which are hereby incorporated by reference herein in their entirety, may be applied to a set of electronic coupon offers.

In a multi-processor environment, an electronic coupon may be uploaded to two or more coupon processors. The two or more coupon processors may or may not be in electronic communication with each other. Thus, in the event that a first coupon processor authorizes the redemption of an electronic coupon at a first POS terminal, a second coupon processor may be unaware of the coupon redemption. This is undesirable at least because the second coupon processor may subsequently authorize a second POS terminal to redeem the electronic coupon that has already been redeemed at the first POS terminal. Thus, this invention includes systems and methods to assist a multi-processor environment to avoid the double redemption of a single coupon.

In such systems and methods, a plurality of coupon processors may pull updated data relating to one or more customers from the electronic coupon platform. In these embodiments, each of the plurality of coupon processors may transmit an electronic request to the electronic coupon platform upon the expiration of a predetermined time period. The predetermined time period may be an hour, day, two days, or any other suitable time period. The electronic request may be configured to request updated customer data.

Upon receipt of the electronic requests from the plurality of coupon processors, the electronic coupon platform may transmit updated customer data to the requesting coupon processors. The updated customer data may include customer data that the electronic coupon platform modified in one or more databases during the predetermined time period. The updated customer data may also include electronic coupon data transmitted to the electronic coupon platform from one or more coupon processors during the predetermined time period. The updated customer data may further include customer data that one or more customers modified during the predetermined time period. The customers may have modified the data using the web-based portal in accordance with the systems and methods of the invention.

Exemplary electronic coupon data transmitted to the electronic coupon platform from a coupon processor may include data relating to a plurality of electronic coupons redeemed by a plurality of customers. The data relating to the redeemed electronic coupons may also include data relating to the time of redemption, location of redemption, total cost of goods being purchased, etc.

It should be noted that, upon receipt of the data from the electronic coupon platform, each of coupon processors may identify one or more customer profiles to which the transmitted data relates. Each of the coupon processors may then update and/or re-upload the identified customer profiles to include the transmitted data. In the embodiments in which the electronic coupon platform transmits to each coupon processor a complete set of customer data for each customer profile stored in each coupon processor, each coupon processor may re-upload the customer data stored in its customer profile database upon receipt of the data.

In some embodiments of the invention, the electronic coupon platform may transmit to each coupon processor electronic coupon data that relates to electronic coupons that one or more point of sale terminals in communication with the coupon processor are configured to redeem. In other embodiments of the invention, the electronic coupon platform may transmit to each coupon processor electronic coupon data relating to one or more electronic coupons that the coupon processor may or may not be configured to redeem. In some of these embodiments, each coupon processor may be configured to filter the data and only store data relating to coupons that it is configured to redeem.

In the event that the electronic coupon platform is in communication with a plurality of coupon processors, one or more of the coupon processors may be configured to send the electronic request for updated customer data at different time periods. For example, in the event that the electronic coupon platform is in communication with ten coupon processors, five of the coupon processors may transmit an electronic request to the electronic coupon platform at midday and five of the coupon processors may transmit the request at midnight. This is desirable at least because it decreases data traffic on the communications medium and enables the electronic coupon platform to supply requested data without the danger of system overload.

In additional embodiments, the electronic coupon platform may transmit updated customer data to a plurality of coupon processors upon the expiration of a predetermined time period. The predetermined time period may be an hour, day, two days, or any other suitable time period. The updated customer data transmitted to the plurality of coupon processors may include electronic coupon data. The electronic coupon data may relate to coupon data that the electronic coupon platform updated in one or more databases during the predetermined time period.

It should be noted that the updated customer data may be any type of updated customer data as described in the embodiments in which the electronic coupon platform receives electronic requests from one or more coupon processors for updated customer data.

It should additionally be noted that, upon receipt of the updated customer data from the electronic coupon platform, each of coupon processors may identify one or more customer profiles to which the transmitted data relates. Each of the coupon processors may then update the identified customer profiles to include the transmitted data. In the embodiments where the electronic coupon platform transmits to each coupon processor a complete set of customer data for each customer profile stored in each coupon processor, each coupon processor may re-upload the customer data stored in its customer profile database upon receipt of the data.

The systems and methods of the invention may include the electronic coupon platform initiating a deposit of funds in a customer bank account associated with a customer at predetermined time intervals. The electronic coupon platform may initiate the deposit of funds in the customer bank account in the event that the electronic coupon platform received data from one or more coupon processors relating to the redemption of one or more electronic coupons by the customer associated with the customer bank account.

In some embodiments, the data relating to the redemption of one or more electronic coupons may include an electronic coupon identifier associated with each of the redeemed electronic coupons. Each electronic coupon identifier may be associated with a redemption value. The data relating to the redemption of one or more electronic coupons may also include data associating the redeemed coupons with the customer that initiated the redemption of the redeemed coupons. For example, the data relating to the electronic coupon identifier may include data that relates to a redemption value and/or that identifies the customer that redeemed the electronic coupon.

Upon receipt of the data from a coupon processor relating to the redemption of one or more electronic coupons by the customer, the electronic coupon platform may store the data and associate it with the customer. For example, this data may be stored in a customer profile associated with the customer that redeemed the coupons. At predetermined time intervals, the electronic coupon platform may initiate a deposit of funds into a customer bank account associated with the customer. The customer bank account may be a customer bank account selected by the customer during initiation of the coupon service.

It should be noted that the electronic coupon platform may be configured to initiate a deposit of funds into a plurality of customer bank accounts at the predetermined time intervals. Each of the customer bank accounts may be associated with one of a plurality of customers enrolled in the coupon service. In these embodiments, the electronic coupon platform may include stored data relating to the redemption of one or more electronic coupons by each of the plurality of customers. The redemptions may have been executed during a predetermined time period. The deposit of funds into each customer bank account may correspond to a sum total of the redemption values associated with the coupons redeemed by the customer associated with each customer bank account.

The electronic coupon platform may use a processor module to initiate the deposit of funds into the customer account. The processor module may also be used to electronically calculate the amount of funds to be deposited in the customer bank account.

In some embodiments, the calculation of the amount of funds to be deposited into a customer account may include summing redemption values associated with each distinct electronic coupon identifier associated with the customer's redeemed coupon data. In other embodiments, the calculation of the redemption value may include removing all duplications of electronic coupon identifiers included in the stored data associated with the customer's redeemed coupons and summing the redemption values associated with the remaining electronic coupon identifiers.

Thus, in the event that an electronic coupon identifier is included twice in the stored data relating to the customer's redeemed coupons, the customer will be credited only once for the redemption value of the redeemed coupon. Thus, the potential problem of double redemption is reduced using these systems and methods of the invention.

It should be noted that the systems and methods of the invention may also be used in the event that a coupon publisher allows a coupon to be used a predetermined number of times. In these embodiments, the electronic coupon identifier relating to the coupon will be configured to be included in the calculation of the amount of funds up to and including the predetermined number of times. In the event that the customer has redeemed the electronic coupon a number of times greater than the predetermined number of times, the systems and methods of the invention may be used to ensure that the customer does not receive credit for the redemptions that exceed the predetermined number. Thus, the systems and methods of the invention are configured to support an electronic coupon according to relevant business guidelines.

In yet other embodiments, the electronic coupon platform may receive data relating to a first electronic coupon and a second electronic coupon redeemed by a customer at one or more coupon processors. The data may include a first electronic coupon identifier associated with the first electronic coupon and a second electronic coupon identifier associated with the second electronic coupon. The electronic coupon platform may store the data relating to the first electronic coupon in a database The database may be reserved for redeemed coupon data. The electronic coupon platform may associate the stored data with the customer.

In the event that the second electronic coupon identifier is different from the first electronic coupon identifier, the electronic coupon platform may store data relating to the second electronic coupon identifier in the database. This stored data may also be associated with the customer.

In some embodiments, in the event that the second electronic coupon identifier is substantially identical to the first electronic coupon identifier, and both identifiers are associated with the same customer, the electronic coupon platform may discard the data relating to the second coupon identifier. In other embodiments, the electronic coupon platform may store the data in a database different from the database in which the storage module stored the data relating to the first electronic coupon identifier. For example, instead of storing the data relating to the second coupon identifier in a customer profile database or a redeemed coupon database, the electronic coupon platform may store the data relating to the second coupon identifier in a 'DOUBLE REDEMPTIONS' database. This database may not be accessed when calculating the amount of funds eligible to be deposited in one or more customer bank accounts.

In these embodiments, the calculation of an amount of funds to be deposited into a customer account may include summing the redemption values associated with each electronic coupon identifier stored in the database and associated with the customer.

It should be noted that, upon completion of the deposit of funds in one or more customer bank accounts, the electronic coupon platform may purge the stored data relating to the redeemed electronic coupons. In other embodiments, the electronic coupon platform may relocate the stored data to a historical database that stores coupon data for analytical purposes.

In yet other embodiments, the electronic coupon platform may electronically tag or otherwise associate the stored data relating to the redeemed electronic coupons with, for example, an 'INACTIVE' status. Thus, during the next predetermined time interval, the electronic coupon platform may not include the coupons with the 'INACTIVE' status in the electronic calculation of the amount of funds to be deposited in a customer bank account.

Furthermore, it should be noted that upon completion of the deposit of funds in one or more customer bank accounts, the electronic coupon platform may transmit data to a plurality of coupon processors. The data may notify the coupon processors of the electronic coupons that the electronic coupon platform used to reimburse customers for their redemption value.

In yet other embodiments, the systems and methods of the invention may include transmitting an electronic notification from the electronic coupon platform to a plurality of coupon processors. The electronic coupon platform may be prompted to transmit an electronic notification to a plurality of coupon processors in the event that the electronic coupon platform receives data from a coupon processor relating to the receipt of a loyalty card and/or payment instrument at a POS terminal. The loyalty card and/or payment instrument may be a loyalty card and/or payment instrument identified during enrollment of a customer in the systems and methods of the invention.

In these embodiments, a coupon processor may be in electronic communication with one or more POS terminals and the electronic coupon platform. The coupon processor may receive information from the electronic coupon platform relating to one or more electronic coupons electronically selected and/or uploaded to a customer's web-based portal via the systems and methods of the invention. In some embodiments, the electronic coupons may be electronic coupons configured to be redeemed at the one or more POS terminals in electronic communication with the coupon processor. The coupon processor may store the customer information in a customer profile database included in a coupon processor memory.

A POS terminal in accordance with the systems and methods of the invention may be configured to read information from a loyalty card and/or payment instrument swiped at a POS terminal receiver. The POS terminal may be configured to substantially immediately or within a predetermined time window thereafter transmit data relating to the receipt of the loyalty card and/or payment instrument to a coupon processor. In some embodiments, the POS terminal may transmit the aforementioned information prior to the receipt of information relating to goods that the customer desires to purchase. In other embodiments, the POS terminal may transmit the aforementioned information together with product SKUs and/or UPCs of goods that the customer desires to purchase.

In the event that the coupon processor receives the information from the POS terminal relating to the receipt of the loyalty card and/or payment instrument, the coupon processor may transmit this information substantially immediately, or within a predetermined time window, to an electronic coupon platform. It should be noted that in some embodiments, the coupon processor may transmit the information in the event that the coupon processors determines that the loyalty card and/or payment instrument information is associated with a customer whose customer information is stored in the customer profile database.

It should be noted that, after transmitting the customer identification information, the coupon processor may subsequently process data relating to the goods that the customer desires to purchase. The coupon processor may then inform the POS terminal of any electronic coupons configured to be applied to the goods. The coupon processor may then transmit information to the electronic coupon platform relating to the electronic coupons redeemed on behalf of the customer at the POS terminal.

In response to the receipt of the information relating to the receipt of the loyalty card and/or payment instrument at the POS terminal, the electronic coupon platform may transmit an electronic notification to one or more coupon processors.

In some embodiments, the one or more coupon processors may be coupon processors that have information relating to the customer identified via the loyalty card and/or payment instrument stored in a customer profile database. In additional embodiments, the one or more coupon processors may be coupon processors grouped in a category that includes the coupon processor that transmitted the data to the electronic coupon platform. For example, in the event that a coupon processor affiliated with a hardware store sends information to an electronic coupon platform relating to the receipt of a loyalty card and/or payment instrument at a POS terminal, the electronic coupon platform may transmit an electronic notification to a plurality of coupon processors associated with hardware store merchandise.

Alternatively, each retailer within a coupon processor may be associated with a group. As such, various retailers across several processors may form members of a single group. Or, in the alternative, some but not all retailers associated with a single processor may form all the members of a single group. Any such permutation of members of group with respect to the various processors is considered within the scope of this invention.

The electronic notification may include instructions. The instructions may instruct the coupon processors to associate the electronic notification with a customer profile associated with the loyalty card and/or payment instrument identified at the POS terminal. The instructions may also instruct the coupon processor to transmit an electronic request for customer profile information to the electronic coupon platform in the event that the coupon processor receives information from a POS terminal relating to the receipt of loyalty card and/or payment instrument information that identifies a customer associated with the customer profile to which the electronic notification has been associated.

In some embodiments, such instructions may be stored at the processor. In these embodiments, receipt of the electronic notification in addition to customer profile identification information may prompt the coupon processors to associate the electronic notification with the identified customer profile. Once the coupon processor associates the electronic notification with the electronic profile, the instructions may instruct the coupon processor to transmit an electronic request for customer profile information to the electronic coupon platform in the event that the coupon processor receives information from a POS terminal relating to the receipt of loyalty card and/or payment instrument information that identifies a customer associated with the customer profile to which the electronic notification has been associated.

In the event that the coupon processor transmits an electronic request for customer profile information to the electronic coupon platform, the electronic coupon platform may transmit to the coupon processor the active coupons associated with the customer profile. The coupon processor may then update his customer profile data to include preferably only the active coupons.

Upon completion of updating the customer profile data, the coupon processor may subsequently be configured to identify one or more active electronic coupons eligible to be redeemed at the POS terminal on behalf of the customer. The coupon processor may execute this determination based on data transmitted from the POS terminal relating to goods that the customer desires to purchase.

For example, a first coupon processor may receive information from a POS terminal that a customer has identified himself Thereafter, the first coupon processor may transmit a notification to an electronic coupon platform that the customer has identified himself to a POS terminal coupled to the first coupon processor. This may cause the electronic coupon platform to transmit an electronic notification to multiple coupon processors alerting them that there has been a status change with respect to the customer. The transmission of the electronic notification may alternatively be initiated if the customer uploads new coupons to his customer account and/or if electronic coupons associated with the customer expire.

Such an electronic notification may prompt the other processors to request updated customer information from the platform when the other processors receive an identification of the customer at POS terminals associated with the respective processors.

Thereafter, the first coupon processor may receive information from a POS terminal relating to one or more goods that the customer desires to purchase. The first coupon processor may identify one or more electronic coupons that the POS terminal is eligible to redeem on behalf of the customer. The first coupon processor may subsequently update customer profile data relating to the customer to reflect the redeemed status of the electronic coupons that the POS terminal redeemed.

The first coupon processor may then transmit information relating to the redeemed coupons to the electronic coupon platform. The electronic coupon platform may update customer profile data relating to the customer to reflect the redeemed status of the electronic coupon—i.e., that the redeemed coupons are now inactive. In certain embodiments, it should be noted that such coupon redemption may or may not trigger an additional electronic notification.

The coupon processors that receive the electronic notification may associate the electronic notification with customer profile data relating to the customer who has identified himself at the POS terminal. In the event that one of the coupon processors receives information from a POS terminal that the customer has identified himself to the POS terminal, the electronic notification may prompt the coupon processor to transmit an electronic request to the electronic coupon platform for customer profile data associated with the customer. The coupon processor may transmit the electronic request to the coupon platform prior to receiving information relating to goods that the customer desires to purchase.

In response to the request, the electronic coupon platform may transmit data relating to the customer to the coupon processor. The data may include active electronic coupons associated with the customer. Upon receipt of the data, the coupon processor may subsequently update customer profile data to include the active electronic coupons associated with the customer. This update may include overwriting the data relating to the customer's active coupons that was previously stored in the coupon processor. This update may alternately include deleting any previously stored coupon data that was not included in the data transmitted from the electronic coupon platform.

Upon completion of updating the customer profile data, the coupon processor may subsequently be configured to authorize a POS terminal to redeem coupons on behalf of the customer. Additionally, upon completion of updating the coupon processor data, the electronic notification associated with the customer profile data may be removed. The coupon processor may subsequently inform the POS terminal of active coupons that the POS terminal is eligible to redeem on behalf of the customer in the event that the POS terminal transmits data to the coupon processor relating to goods that the customer desires to purchase. It should be noted that, in certain embodiments, the POS terminal may or may not be blocked from redeeming coupons during the updating process.

Upon the expiration of a predetermined time period, such as a day, week, month, or any other suitable time period, the electronic coupon platform may update customer profile data stored in one or more coupon processors. The electronic coupon platform may update one or more customer profiles relating to one or more customers. The update may include transmitting information relating to active electronic coupons associated with one or more customer profiles. In the event that a coupon platform updates customer profile data in response to the receipt of updated customer profile data from the electronic coupon platform, any electronic notifications associated with the updated customer profiles may be removed.

The electronic coupon platform may transmit updated customer profile information to coupon processors to which an electronic notification relating to the customer profile(s) has been transmitted. In some embodiments, the electronic coupon platform may transmit updated customer profile data to coupon processors to which the electronic coupon platform has transmitted a threshold number of electronic notifications.

Furthermore, in certain embodiments, the electronic coupon platform may update one or more customer profiles stored in an electronic coupon platform memory during a predetermined time period. In these embodiments, upon the expiration of the predetermined time period, the electronic coupon platform may transmit updated customer profile data to multiple coupon processors, the updated customer profile data relating to the customer profiles that the electronic coupon platform has updated during the predetermined time period.

It should be noted that the electronic coupon platform may transmit any other suitable data to the coupon processors in addition to customer profile data.

It should additionally be noted that, in some embodiments, the transmission of electronic requests to the electronic coupon platform and/or the sending of updated customer data from the electronic coupon platform to a plurality of coupon processors, as described above, may be used to initiate the transmission of the customer profile data.

It should also be noted that, in the event that a customer modifies information such as customer information and/or customer uploaded electronic coupons via a web-based portal, the electronic coupon platform may transmit an electronic notification to one or more coupon processors. The one or more coupon processors may be coupon processors that have customer profile data relating to the customer stored in a database. Alternatively, in other embodiments, the electronic coupon platform may transmit updated customer profile data to the one or more coupon processors, the updated data including the customer modifications executed via the web-based portal.

In yet other embodiments, the systems and methods of the invention may include transmitting customer selection information to multiple coupon processors. The customer selection information may relate to one or more electronic coupon selections executed by a customer on a web-based portal in accordance with the systems and methods of the invention. One or more of the multiple coupon processors may be associated with a loyalty card program.

In some embodiments, a customer may select an electronic coupon on a web-based portal. Substantially immediately thereafter, the web-based portal may transmit data relating to the customer and the selected electronic coupon to a plurality of coupon processors. Each of the plurality of coupon processors may be in electronic communication with one or more POS terminals.

In additional embodiments, the customer may select one or more electronic coupons on a web-based portal and subsequently execute a selection submission indicating the completion of the customer's electronic coupon selection. For example, the customer may select a 'FINISHED,' 'SUBMIT' and/or 'SUBMISSION' button. Substantially immediately thereafter, the web-based portal may transmit data relating to the customer and the one or more selected electronic coupons to a plurality of coupon processors. Each of the plurality of coupon processors may be in electronic communication with one or more POS terminals.

In some embodiments, the electronic coupon platform may transmit the data to all coupon processors in electronic communication with the electronic coupon platform. In other embodiments, the electronic coupon platform may transmit data relating to one or more electronic coupons to coupon processors that are configured to redeem at least one of the one or more electronic coupons. In further embodiments, the electronic coupon platform may transmit to each of a plurality of coupon processors data relating to electronic coupons that each of the plurality of coupon processors is configured to redeem.

These systems and methods may include associating each of the electronic coupons offered on the web-based portal with one or more groups. In these embodiments, each of the coupon processors in electronic communication with the web-based portal may additionally be associated with one or more groups. Thus, in these embodiments, the electronic coupon platform may transmit selected electronic coupon data at least to coupon processors that are associated with least one of the groups with which the selected electronic coupons are associated.

For example, the web-based portal may associate a coupon for a screwdriver with a 'hardware' group. The web-based portal may additionally associate three coupon processors in electronic communication with the web-based portal as being associated with a 'hardware' group. Each of these three coupon processors may be in communication with point of service terminals configured to redeem one or more hardware-related items. Thus, in the event that a customer selects the coupon for the screwdriver, the web-based portal may transmit information relating to the selected coupon and the customer to each of the three coupon processors associated with the 'hardware' group.

The association of an electronic coupon with a group may be accomplished using an electronic code, tag identifier, or any other suitable information. In these embodiments, the electronic coupons processor may use electronic information associated with the electronic coupon to determine the coupon processors to which the electronic coupon is to be sent.

These systems and methods may also include configuring coupon processors to filter data received from an electronic coupon platform. In these embodiments, the electronic coupon platform may transmit a batch of electronic coupons to a plurality of electronic coupon platforms, each of the electronic coupons being associated with at least one customer. Each of the plurality of coupon processors may subsequently be configured to remove from the batch any electronic coupons that each of the plurality of coupon processors is not configured to redeem and/or that do not relate to the customers stored in their database. Upon completion of filtering the data, each of the plurality of coupon processors may store the remaining data in a customer profile database.

It should be noted that the systems and methods of the invention include multiple embodiments of electronic coupon transmission, reception, filtering, modifying, applying, redeeming and deleting. Each method described in one embodiment of the invention may be combined with a method described in a different embodiment of the invention to create a system or method within the scope of the invention at hand.

It should additionally be noted that the electronic coupon platform may transmit funds to one or more coupon processors upon the lapse of one or more predetermined time periods. The amount of funds transmitted may include a set fee and/or may be based on the coupons redeemed at the coupon processors.

Illustrative embodiments of the invention will now be described with reference to FIGS. 1-16.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 is a block diagram that illustrates a generic computing device 101 (alternatively referred to herein as a "server") that may be used according to an illustrative embodiment of the invention. For example, generic computing device 101 may be used to support one or more functions of a point of sale device, coupon processor, and/or electronic coupon platform according to the invention. The computer server 101 may have a processor 103 for controlling overall operation of the server and its associated components, including RAM 105, ROM 107, input/output module 109, and memory 115.

Input/output ("I/O") module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by server 101, such as an operating system 117, application programs 119, and an associated database 111. Alternatively, some or all of server 101 computer executable instructions may be embodied in hardware or firmware (not shown). As described in detail below, database 111 may provide storage for enrolled customer information, payment instrument and/or loyalty card information, electronic coupon offer information, customer selections of electronic coupons, redeemed electronic coupons and/or any other suitable information.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 113. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

Terminal 151 and/or terminal 141 may be portable devices such as a laptop, cell phone, blackberry, or any other suitable device for storing, transmitting and/or transporting relevant information.

Data related to enrolled customer information, payment instrument and/or loyalty card information, electronic coupon offer information, customer selections of electronic coupons, redeemed electronic coupons and/or any other suitable information may be stored in memory 115.

The invention may be operational with numerous other general purpose or special purpose computing system environments or configurations. Examples of well known computing systems, environments, and/or configurations that may be suitable for use with the invention include, but are not limited to, personal computers, server computers, handheld or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
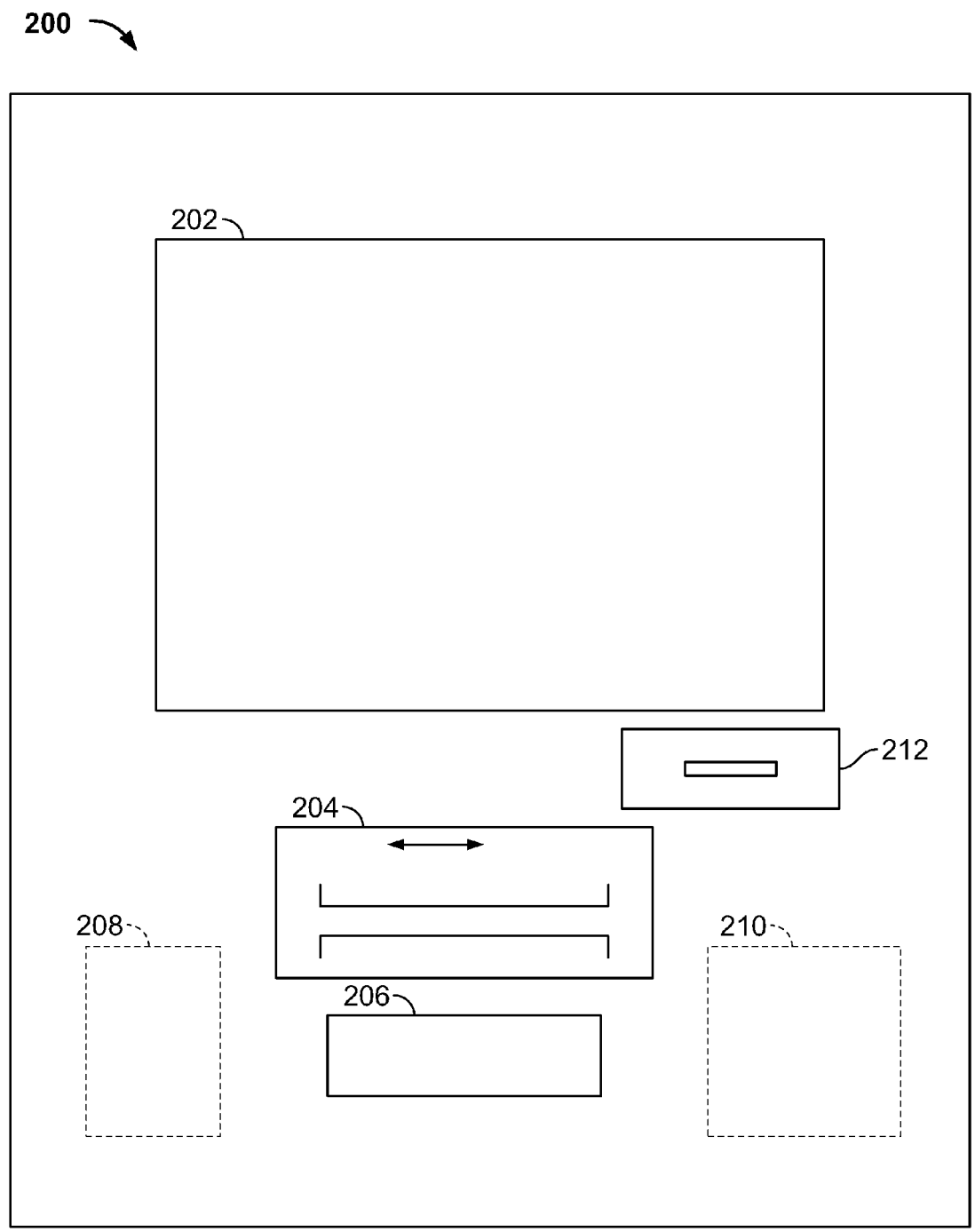
FIG. 2 shows other apparatus in accordance with the principles of the invention.

FIG. 2 shows illustrative kiosk 200. Kiosk 200 may be a kiosk that performs tasks in connection with enrollment of customers in a coupon service, distribution of electronic coupons to customers and any other suitable tasks. Kiosk 200 may be placed in a location that is convenient for customers to use before or during shopping activities in connection with merchant M. Kiosk 200 may perform one or more of the tasks associated with step 706 (shown in FIG. 700) or any other suitable tasks. In particular, kiosk 200 may be used to allow a customer to enroll in an coupon service or to view, print or download electronic coupon information so that a customer can receive benefits, including electronic coupons, in connection with purchases from merchant M.

Kiosk 200 may include touch screen display 202 for displaying instructions, electronic coupon information and any other suitable information to customer C. Kiosk 200 may include printer 212 for printing electronic coupon information, such as selected electronic coupon information, and other suitable information. Kiosk 200 may include card reader 204 for reading a loyalty card and/or a purchasing instrument, such as a credit or debit card. The loyalty card and/or purchasing instrument may be swipeable and/or contactless. Kiosk 200 may include near field communication module 206 for communicating with an NFC-equipped purchasing instrument such as a cellular telephone. Kiosk 200 may include processor 208 for encoding data from the loyalty card and/or purchasing instrument. Kiosk 200 may include communications module 210 for exchanging the encoded data and any other received data via an electronic communication network with a coupon processor and/or an electronic coupon platform.

In some embodiments, some or all of the functions of kiosk 200 may be present in a self-service device such as an automatic teller machine ("ATM"), a ticket- or token-vending machine, an information dispensing machine (such as are found in public transportation stations, such as train and bus stations and airports) and/or a web-based portal accessible via the internet.

Figure 3:
FIG. 3 shows an electronic display in accordance with the principles of the invention.
Figure 4:
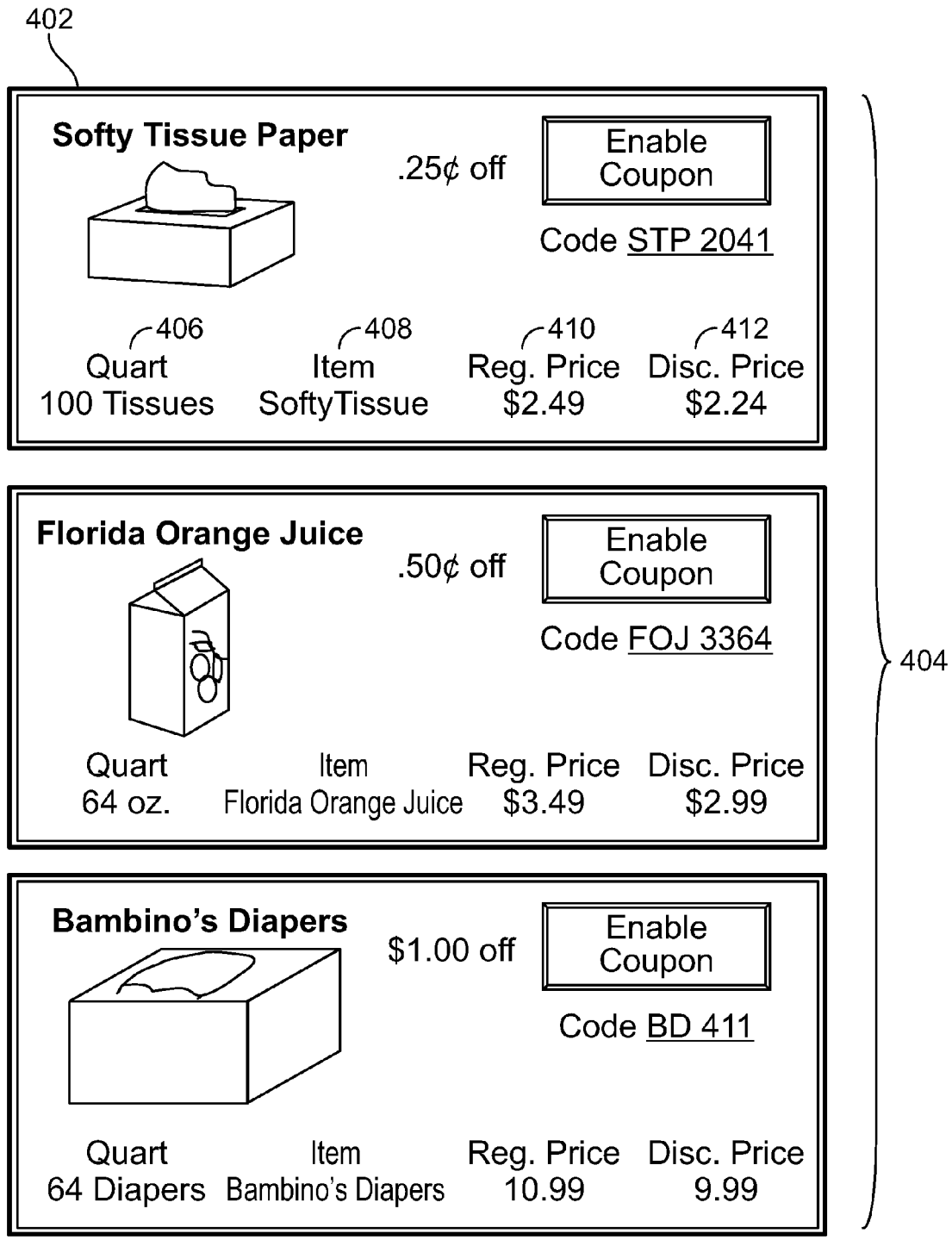
FIG. 4 shows another electronic display in accordance with the principles of the invention.

FIGS. 3-4 show illustrative views for display to customer C at a kiosk such as kiosk 200 (shown in FIG. 2), on a web-based portal in accordance with the systems and methods of the invention, or on some other suitable screen. The illustrative views illustrated in FIGS. 3-4 may offer customer C an opportunity to view electronic coupons to which customer C may be entitled, to enroll in a coupon service and/or to present selectable electronic coupons for customer C to select. In the event that customer C selects an electronic coupon, customer C may enable the redemption of the electronic coupon at one or more POS terminals in the event that customer C swipes a payment instrument and/or loyalty card enrolled in the coupon service at the POS terminal.

It should be noted that some customer-interactive aspects of the current invention involve the use of swipeable cards. It will be understood that swipeable cards such as a credit card and/or loyalty card are discussed herein as an example of a purchasing instrument and that any suitable purchasing instrument may be used.

FIG. 3 shows a graphical display. The graphical display may be included in a web-based portal in accordance with the invention.

The graphical display shown in FIG. 3 may include text 302 that invites customer C to enroll in a coupons service. Text 302 may be selectable. Upon selection of text 302, a second graphical display (not shown) may prompt customer C to input payment instrument information, loyalty card information, customer C information, or other suitable information. The graphical display may then identify electronic coupons available to customer C by communicating with an electronic coupon platform. The graphical display may display textual, graphical or audio representations (not shown) of the electronic coupon offers. The graphical display may provide customer C with an opportunity to request a hardcopy version of the electronic coupon offers.

FIG. 4 shows an additional graphical display. The graphical display may be included in a web-based portal in accordance with the invention.

The graphical display shown in FIG. 4 may be displayed to a customer C in response to an electronic selection executed by customer C. The graphical display shown in FIG. 4 shows electronic coupon information 402. Electronic coupon information 402 may include for each electronic coupon 404 quantity 406, item identifier 408, regular price 410, discounted price 412 and location in store ("AISLE") (not shown). Any other suitable information may be included.

Figure 5:
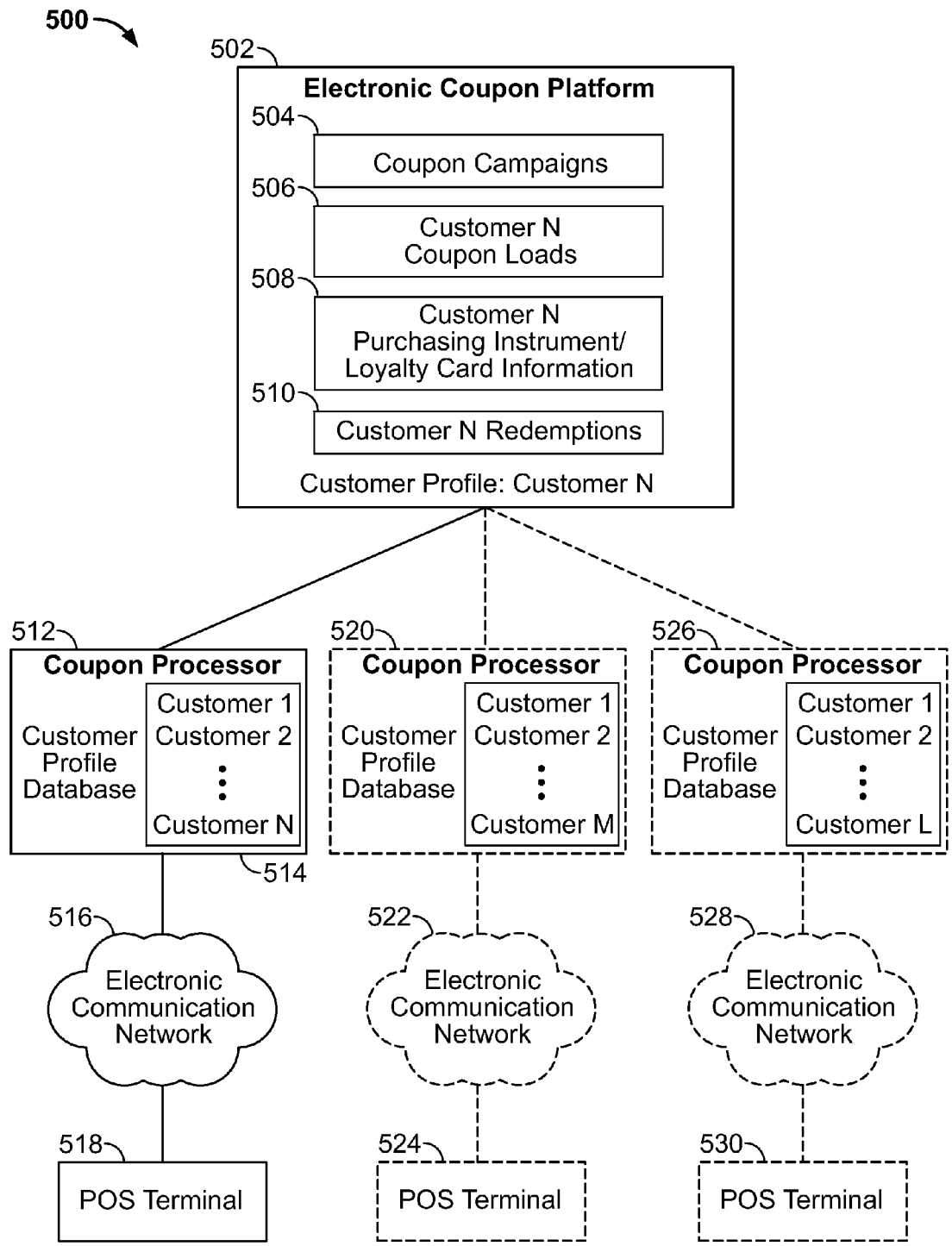
FIG. 5 shows still other apparatus in accordance with the principles of the invention.

FIG. 5 shows illustrative apparatus 500 for transmission and redemption of electronic coupons electronically selected by a customer N via a web-based portal in accordance with the systems and methods of the invention. The selected electronic coupons may be associated with a customer N customer profile. The customer N customer profile may be stored in a database included in electronic coupon platform 502. Electronic coupon platform 502 may be in electronic communication with one or more of coupon processors 512, 520 and/or 526.

In illustrative apparatus 500, customer N may receive electronic coupon information from electronic coupon platform 502. Customer N may view the electronic coupon information via coupon campaigns 504. The electronic coupon information may include information relating to electronic coupons such as discounted products, offering merchants, locations, discount amounts, offer terms (including, for example, a period of validity, identities of participating merchants and the like) and other suitable information.

Customer N may select one or more electronic coupons displayed in coupon campaigns 504. Selection of the one or more electronic coupons displayed in coupon campaigns 504 may result in the selected electronic coupon(s) being loaded onto and stored in customer N coupon loads 506.

In the event that one or more of the loaded coupons are configured to be used at POS terminal 518, information relating to the one or more coupon(s) and customer N may be transmitted from electronic coupon platform 502 to coupon processor 512. Coupon processor 512 may store the transmitted information in customer profiles 514. The stored information may be associated with a customer N customer profile included in customer profiles 514.

In the embodiments in which electronic coupon platform 502 is in electronic communication with coupon processor 520, electronic coupon platform 502 may transmit to coupon processor 520 information relating to loaded coupon(s) configured to be redeemed at POS terminal 524. Coupon processor 520 may store the transmitted data in a customer profile database and associated the stored data with an appropriate customer profile. For example, a loaded coupon may be configured to be redeemed at POS terminal 524 in the event that a customer N profile is included in coupon processor 520's customer profile database. In other embodiments, a loaded coupon may be configured to be redeemed at POS terminal 524 in the event that a merchant location at which POS terminal 524 is located offers for sale the items(s) to which the loaded coupon(s) are configured to be applied.

In the embodiments in which electronic coupon platform 502 is in electronic communication with coupon processor 526, electronic coupon platform 502 may transmit to coupon processor 526 information relating loaded coupon(s) that are configured to be redeemed at POS terminal 530. Coupon processor 526 may store the transmitted data in a customer profile database and associated the stored data with an appropriate customer profile.

Customer N may subsequently purchase one or more items at POS terminal 514. Prior to the purchase of the goods, customer N may swipe a purchasing instrument and/or loyalty card at POS terminal 514. POS terminal 514 may subsequently transmit information relating to the goods that customer N desires to purchase, in addition to purchasing instrument and/or loyalty card information included on the swiped card, to coupon processor 510. POS terminal 514 may transmit the information via electronic communication network 516.

Upon receipt of the data from POS terminal 514, coupon processor 510 may determine if the purchasing instrument and/or loyalty card information identifies a customer stored in customer profiles 512. In the event that customer N swiped the purchasing instrument/loyalty card whose information is stored in customer N purchasing instrument/loyalty card information 508, coupon processor 510 may identify customer N as the purchasing customer. Coupon processor 510 may subsequently determine if the electronic coupons stored in customer N's customer profile 512 are configured to be applied to one or more items that customer N desires to purchase.

Coupon processor 510 may inform POS terminal 514 of customer N electronic coupons eligible to be redeemed and/or a discount to be applied to one or more goods that customer N desires to purchase. POS terminal 514 then may then adjust the purchase price of customer N's goods accordingly.

Customer N may also purchase one or more items at POS terminals 524 and/or 530. The method for coupon identification and/or redemption at POS 524 may be executed using one or more of the steps described above for coupon identification and/or redemption at POS terminal 514.

Figure 6:
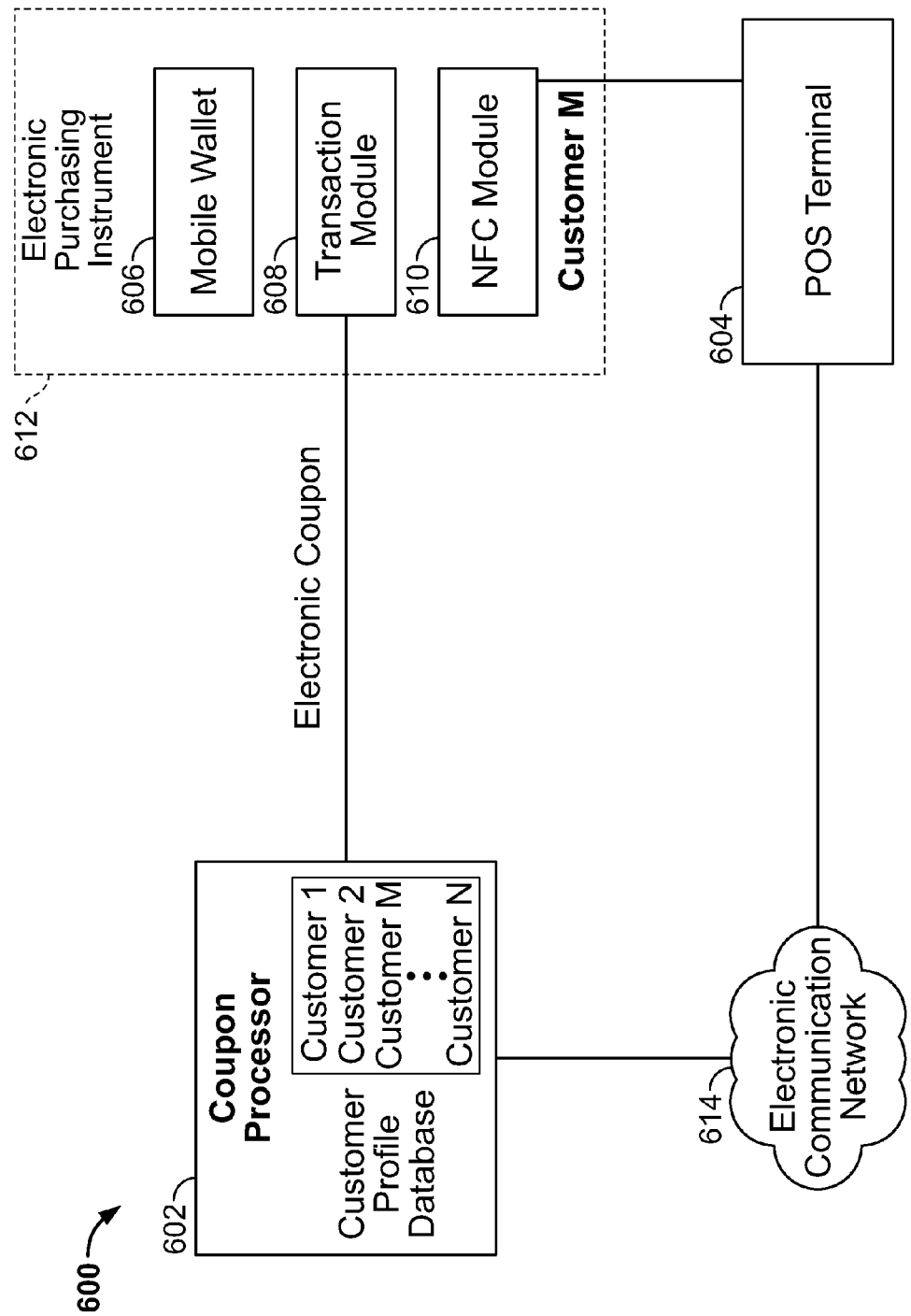
FIG. 6 shows still other apparatus in accordance with the principles of the invention.

FIG. 6 shows illustrative apparatus 600 for transmission of electronic coupons from a coupon processor such as coupon processor 602 to a customer such as customer M and for transmission of customer information from customer M to a POS terminal such as POS terminal 604. POS terminal 604 may be an internet protocol based POS terminal.

In apparatus 600, coupon processor 602 may transmit to customer M electronic coupons offer notifications and electronic coupon information. The electronic coupon offer notifications may be transmitted using a protocol that requires validation of customer M's identity. Customer M's identity may be encoded in mobile wallet 606, which may be present in electronic purchasing instrument 612. Electronic purchasing instrument 612 may be in a cellular telephone and may be in communication with the operating system of the cellular telephone.

Mobile wallet 606 may include secure identification information that associates customer M with customer M's personal and credit information. The notifications may include information regarding discounted products, offering merchants, locations, discount amounts and other suitable information. It should be noted that the systems and methods of the invention include mobile wallets described in patent application Ser. No. 12/362,565, entitled ELECTRONIC WALLET ("eWallet"), filed Jan. 30, 2009, which is hereby incorporated by reference in its entirety.

Coupon processor 602 may select the offers for which to send the notifications based on an account established for customer M on coupon processor 602. Customer M may view the notifications on a display (not shown) on electronic purchasing instrument 612. Customer M may select electronic coupons that he desires to use in connection with a purchase. The mobile wallet may send an electronic communication to coupon processor 602 relating to the selected electronic.

When customer M purchases one or more items from a merchant, customer M may present electronic purchasing instrument 612 to the merchant. Electronic purchasing instrument 612 may include transaction module 608. Transaction module 608 may include instructions and protocols for exchanging customer, offer, electronic coupon, transaction and any other suitable information with POS terminal 604. Electronic purchasing instrument 612 may include near field communication ("NFC") module 610 for wireless communication of the customer, offer, electronic coupon, transaction and/or other suitable information with POS terminal 604.

POS terminal 604 may use some or all of the customer, offer, electronic coupon, transaction and other suitable information to recalculate prices that customer M will pay for goods being purchased. Alternately, POS terminal 604 may use the customer and/or transaction information to communicate with coupon processor 602 to determine if there are any selected electronic coupons available to adjust the price of customer M's pending purchase.

POS terminal 604 may communicate with coupon processor 602 via electronic communication network 614. Electronic communication network 614 may be the Internet. POS terminal 604 may communicate with coupon processor 602 to validate the validity of information such as electronic coupon information and other suitable information. POS terminal 604 may communicate with coupon processor 602 to verify or determine if customer M is entitled to one or more electronic coupons. POS terminal 604 may additionally communicate with coupon processor 602 to verify the identity of the entity that is to pay for the value of the offer (e.g., a product manufacturer). POS terminal 604 may further communicate with coupon processor 602 to notify the paying entity about the transaction.

Figure 7:
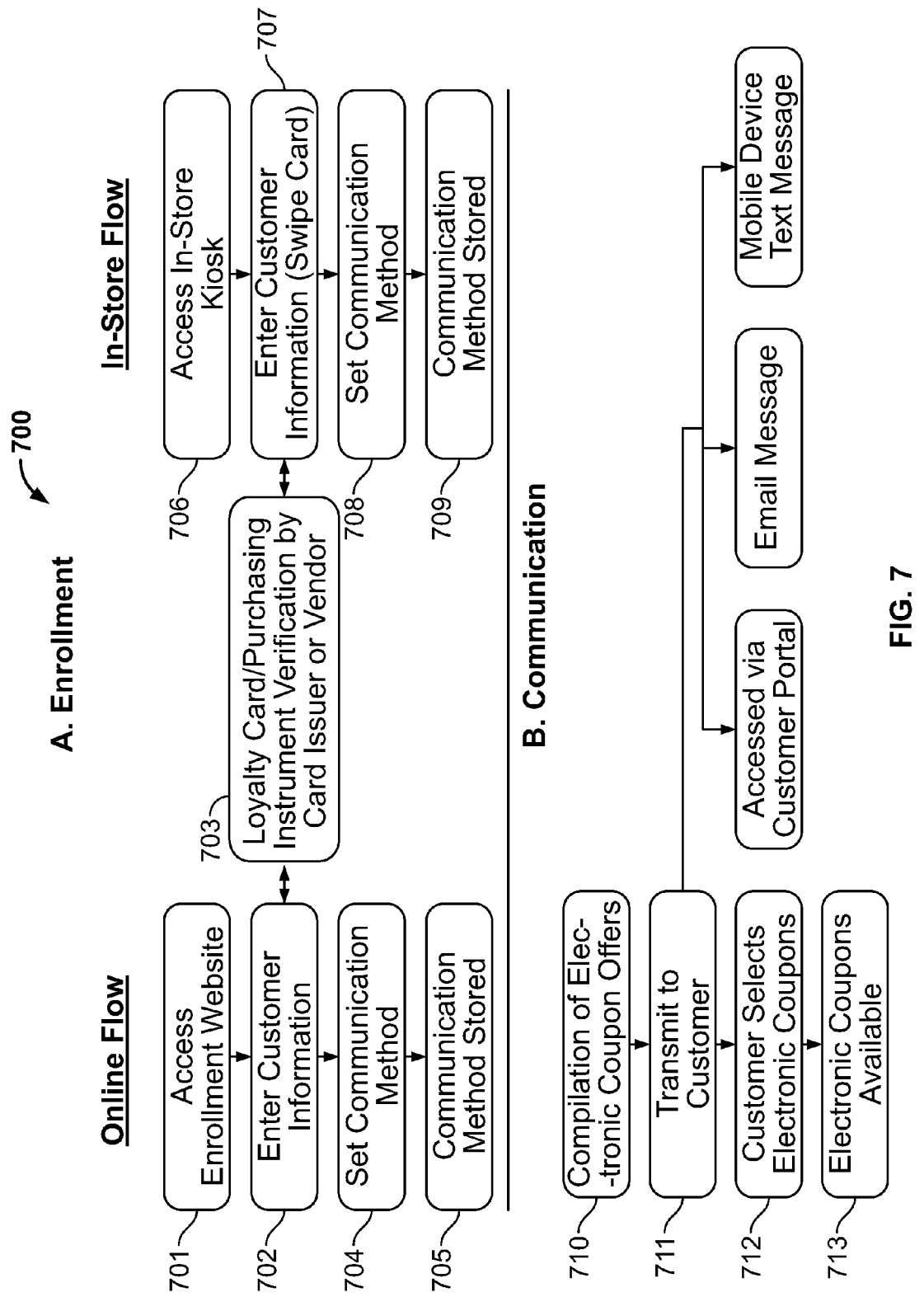
FIG. 7 is a flow diagram of a process in accordance with the principles of the invention.

FIG. 7 shows illustrative process 700 for enrollment of a loyalty card and/or a purchasing instrument and establishment of communication methods for communicating electronic coupons to a customer. The vertical paths in the flow diagram show primary processes and the horizontal paths show related sub-processes.

Process 700 shows two parallel methods for loyalty card and/or purchasing instrument enrollment. At steps 701 through 705, the loyalty card and/or purchasing instrument are enrolled via a web-based portal in accordance with the systems and methods of the invention. The web-based portal may be associated with the purchasing instrument provider. At steps 706 through 709, the loyalty card and/or purchasing instrument are enrolled via a kiosk. The kiosk may be associated with the loyalty card provider.

At step 701, a customer accesses an enrollment website via the web-based portal. At step 702, the customer enters customer information including loyalty card/purchasing instrument information. At step 703, loyalty card/purchasing instrument information is verified by card issuer or vendor. At step 704, the customer selects a communication method for the communication of electronic coupons. More than one communication method may be selected. At step 705, the communication method preferences are stored.

In some embodiments, the communication method may support bidirectional communication between the web-based portal and the customer. The web-based portal may transmit, via the selected communication method(s), electronic coupon information to the customer. The customer may select one or more of the electronic coupons. Appropriate apparatus (such as a personal computer, a cell phone, a PDA, a kiosk, an ATM or any other suitable apparatus) may transmit information relating to the selected coupons to the web-based portal. The web-based portal may store information relating to the selected coupons.

In an alternative enrollment process, at step 706, a customer accesses an in-store kiosk at a participating retailer. At step 707, the customer enters customer information by swiping the magnetic stripe of a loyalty card and/or purchasing instrument in a card reader. At step 708, the customer selects a communication method. At step 709, the communication method preferences are stored.

A more detailed illustration of the communication of electronic coupons from the coupon processor to the customer is detailed at steps 710 through 713.

At step 710, electronic coupon offers are compiled by the web-based portal. At step 711, the list of coupon offers is transmitted to the customer. Process 700 includes three illustrative methods of transmission: making the list available on the web-based portal, sending the list in an email message, or sending a text message to a mobile device. At step 712, the customer may select electronic coupons for application. The selected coupons are stored in a database and electronically transmitted to one or more coupon processors. At step 713, the coupons are available for application at one or more POS terminals in electronic communication with the one or more coupon processors. Coupon discounts associated with the selected coupons are applied when the enrolled purchasing instrument and/or loyalty card is used for a purchase at the one or more POS terminals and items associated with the selected coupons are presented for purchase.

Figure 8:
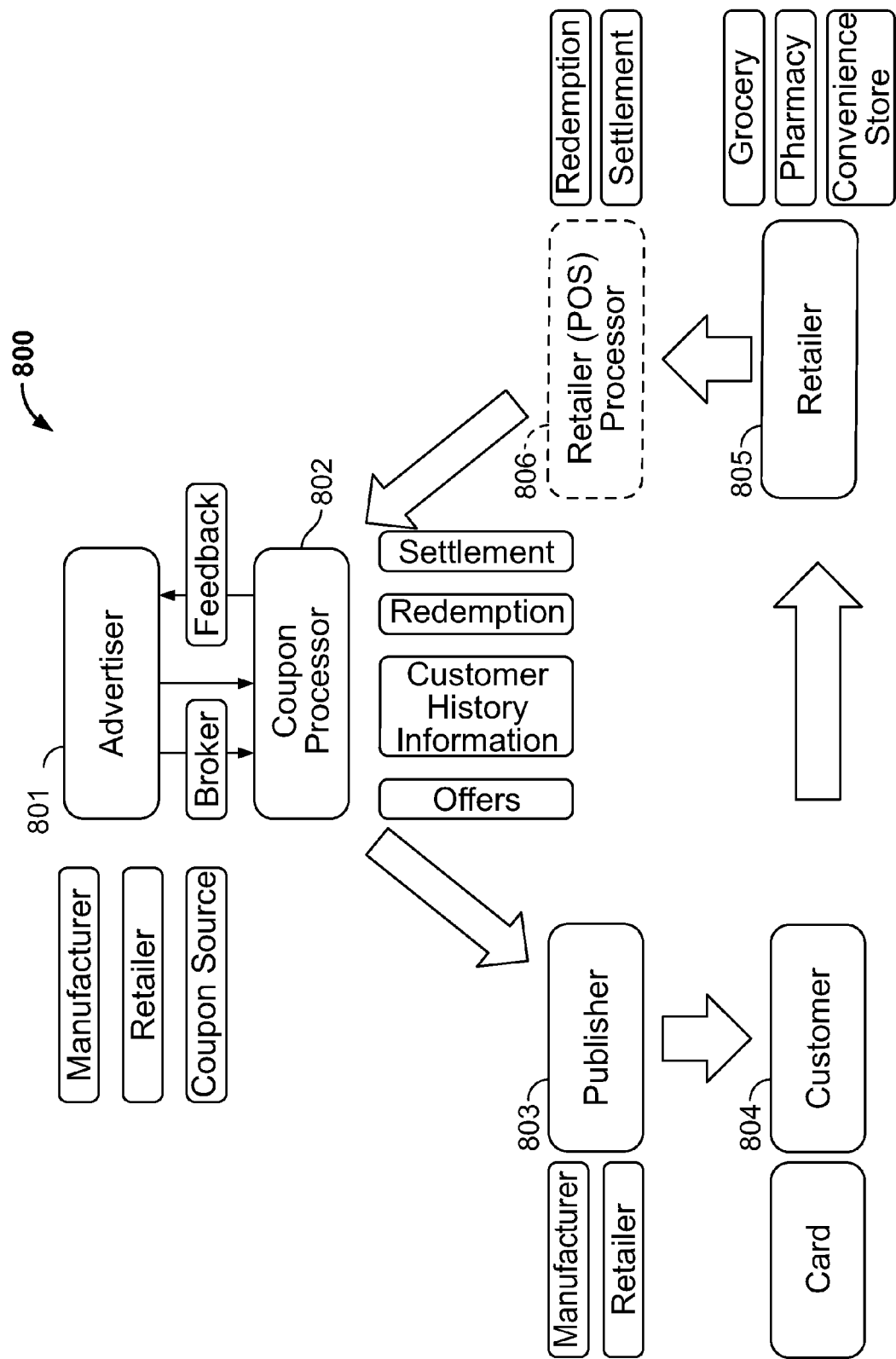
FIG. 8 is another flow diagram of a process in accordance with the principles of the invention.

FIG. 8 shows high level process 800 illustrating the entities involved in customer electronic coupon publication, selection and redemption. The primary entities identified in process 800 may be companies, individuals or technological processes.

Entity 801 is an advertiser. Entity 802 is a coupon processor. Coupon offers from various advertisers may be compiled on the coupon processor. Sources for coupon offers include manufacturers, retailers and commercial coupon sources. Entity 803 is a publisher of coupon offers. The publisher may be a payment card provider that provides a coupon service designed for its payment card users. For example, the publisher may be a bank that publishes coupons for account holders enrolling in a bank issued debit or credit card. The publisher may utilize an electronic coupons platform and/or a web-based portal in accordance with the systems and methods of the invention to inform a customer of coupons received from the coupon processor.

Entity 804 is a customer with a debit or credit card. The customer may enroll the card in the coupons service and choose a communication method to receive the published coupons. Entity 805 is a retailer location. The customer may use the enrolled payment card at the retailer location to trigger application of coupons. Entity 806 is a retail processor. The retailer processor may be a point of sale terminal (POS) located at entity 805 (the retailer location). Coupons may be processed for redemption and settlement by the point of sale terminal or may be electronically transmitted directly to the coupon processor for redemption and settlement. Feedback regarding coupon redemption may be transmitted back to the advertiser 801.

Figure 9:
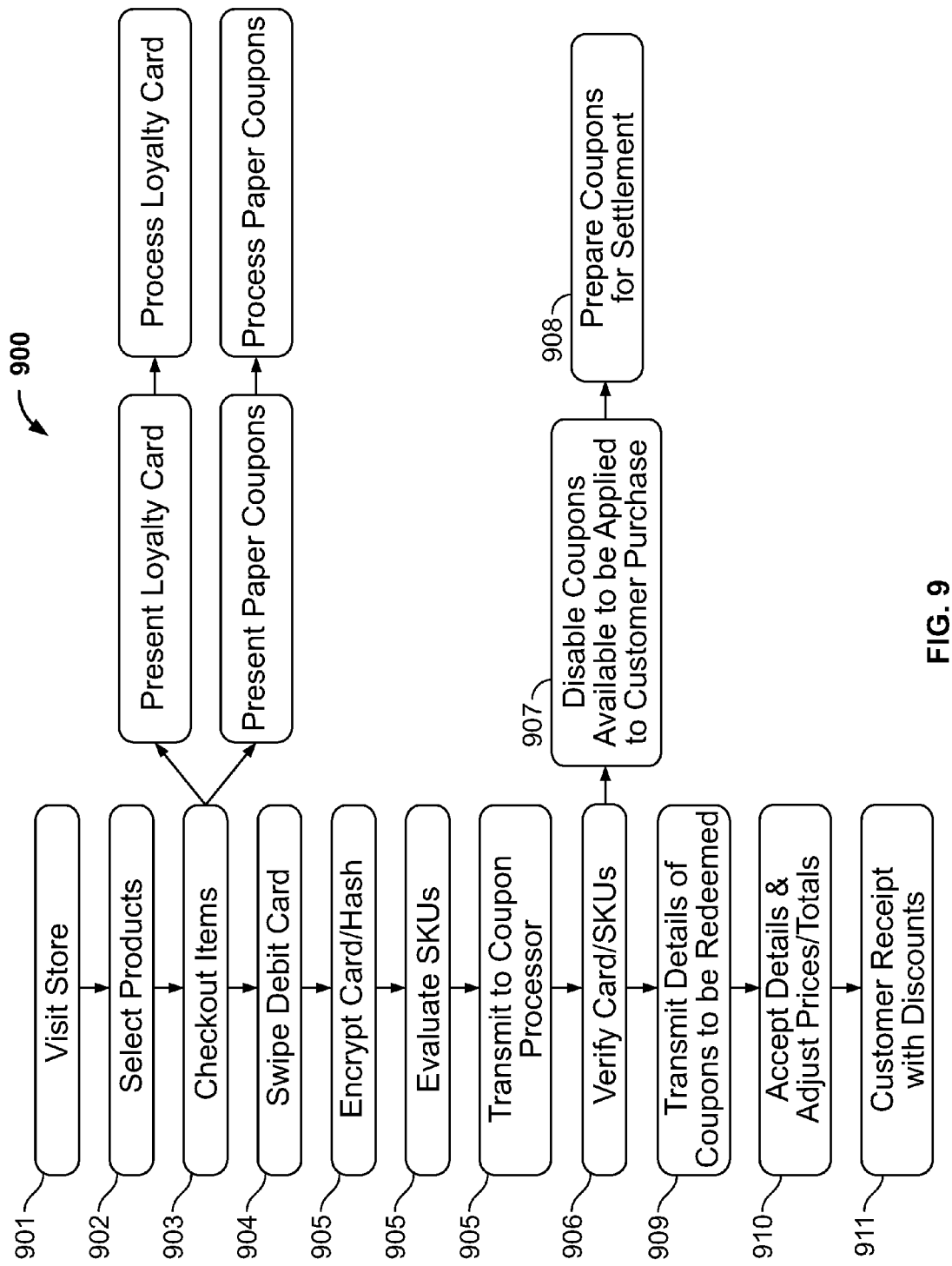
FIG. 9 is yet another flow diagram of a process in accordance with the principles of the invention.

FIG. 9 shows illustrative process 900 outlining a purchase at a POS terminal where electronic coupons are applied. In illustrative process 900, the purchasing instrument is a debit card. Process 900 may correspond in whole or in part to a portion of the process illustrated in FIG. 7.

At step 901, the customer visits a participating retailer. At step 902 the customer selects products for purchase. At step 903, the products are checked out at a POS terminal. The POS terminal may process any paper coupons and store loyalty card discounts may be applied. At step 904, the customer may swipe a debit card for payment. At step 905, encrypted debit card information and the product SKUs may be electronically transmitted from the POS terminal to a coupon processor. The coupon processor may comprise a database including information relating to customer-selected electronic coupons.

At step 906, the coupon processor associates the encrypted card information with a customer profile relating to the customer at the POS terminal and verifies the product SKUs. In a sub-process, the coupon processor disables coupons available to be applied to the customer purchase at step 907 and prepares the coupons for settlement at step 908.

The primary process continues at step 909. At step 909, the coupon processor transmits details of electronic coupons to be redeemed to the POS terminal. At step 910, the POS terminal accepts the details of the discount and adjusts prices or totals for the items purchased. At step 911, the customer is provided with a receipt showing the discounts attributable to the applied electronic coupons.

Figure 10:
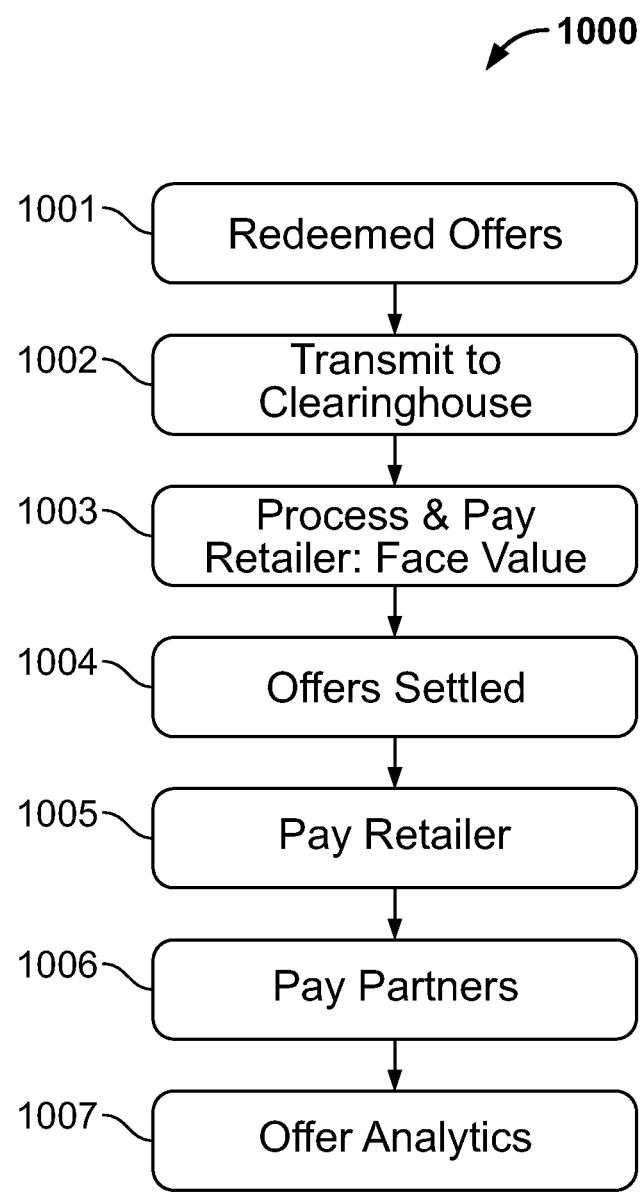
FIG. 10 is still another flow diagram of a process in accordance with the principles of the invention.

FIG. 10 shows illustrative process 1000 for the settlement of redeemed electronic coupons. At step 1001 redeemed coupon offers stored on the coupon processor are ready for settlement. At step 1002, the redeemed coupon data is transmitted to a clearing house. At step 1003, the coupons are processed and the payment for retailers is allocated. Retailers may be reimbursed for the face value of the coupons. Alternatively, retailers may be reimbursed for a previously-agreed upon value that is different from the face value of the coupon. At step 1004, the offers are settled. At step 1005, payment is transmitted from the coupon processor to the retailers. At step 1006, payment is transmitted to partners participating in providing the coupon offers. At step 1007, redemption data is transmitted to offer analytics and stored on the platform for use in directing future coupon offers to the customer.

It should be noted that in other embodiments the redeemed coupon data may additionally and/or alternatively be transmitted to an electronic coupon platform. In some of these embodiments, the electronic coupons platform may perform one or more of steps 1001-1007 associated with the settlement of redeemed electronic coupons.

Figure 11:
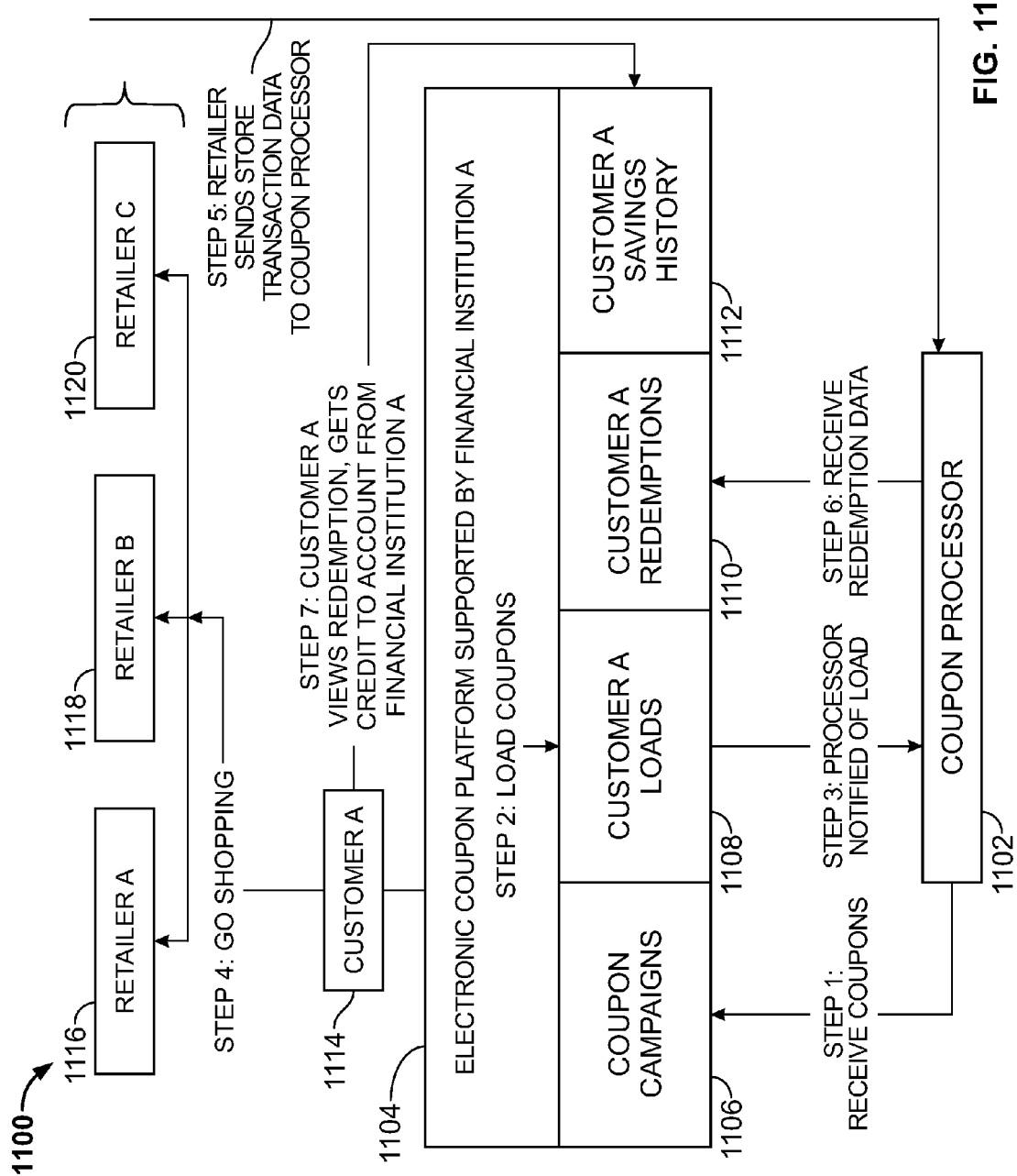
FIG. 11 is still another flow diagram of a process in accordance with the principles of the invention.

FIG. 11 shows illustrative process 1100 in accordance with systems and methods of the invention. Illustrative process 1100 may include elements 1102-1120. Element 1102 may represent a coupon processor. The coupon processor may be in electronic communication with retailers A-C, illustrated in elements 1116, 1118 and 1120, respectively. Retailers A-C may be POS terminals located at one or more retail stores.

Element 1104 may represent an electronic coupon platform. The electronic coupon platform may be supported by financial institution A. Electronic coupon platform 1104 may support multiple functionalities, including coupon campaigns 1106, customer A loads 1108, customer A redemptions 1110 and storage of customer A savings history 1112.

Illustrative process 1100 may be a process that includes one or more of steps 1-7. Coupon campaigns 1106 may receive coupons from coupon processor 1102 at step 1. Customer A, represented by element 1114, may load coupons onto a database associated with customer A loads 1108 at step 2. Coupon processor 1102 may be notified of the load at step 3. Upon notification of the load at step 3, coupon processor 1102 may store data relating to customer A's loaded coupons in a customer profile database. The stored data may be associated with a customer A profile. The customer profile database may include multiple customer profiles.

Customer A may go shopping at a retail location associated with one of retailers A-C at step 4. One of retailers A-C may send store transaction data (such as receipt of a loyalty card and/or payment instrument, purchase details, coupon redemption data, etc.) to coupon processor 1102 at step 5. Coupon processor 1102 may transmit redemption data to customer A redemptions 1110 at step 6. The redemption data may relate to electronic coupons stored in customer A's customer profile that have been redeemed via customer A's purchase at one of retailers A-C.

At step 7, customer A may view redemption data relating to coupons that customer A uploaded to customer A loads 1108 and subsequently redeemed at one or more of retailers A-C. At step 7, customer A may additionally receive credit in an account associated with financial institution A. The credit may relate to the sum of the redemption values associated with each redeemed coupon.

Figure 12:
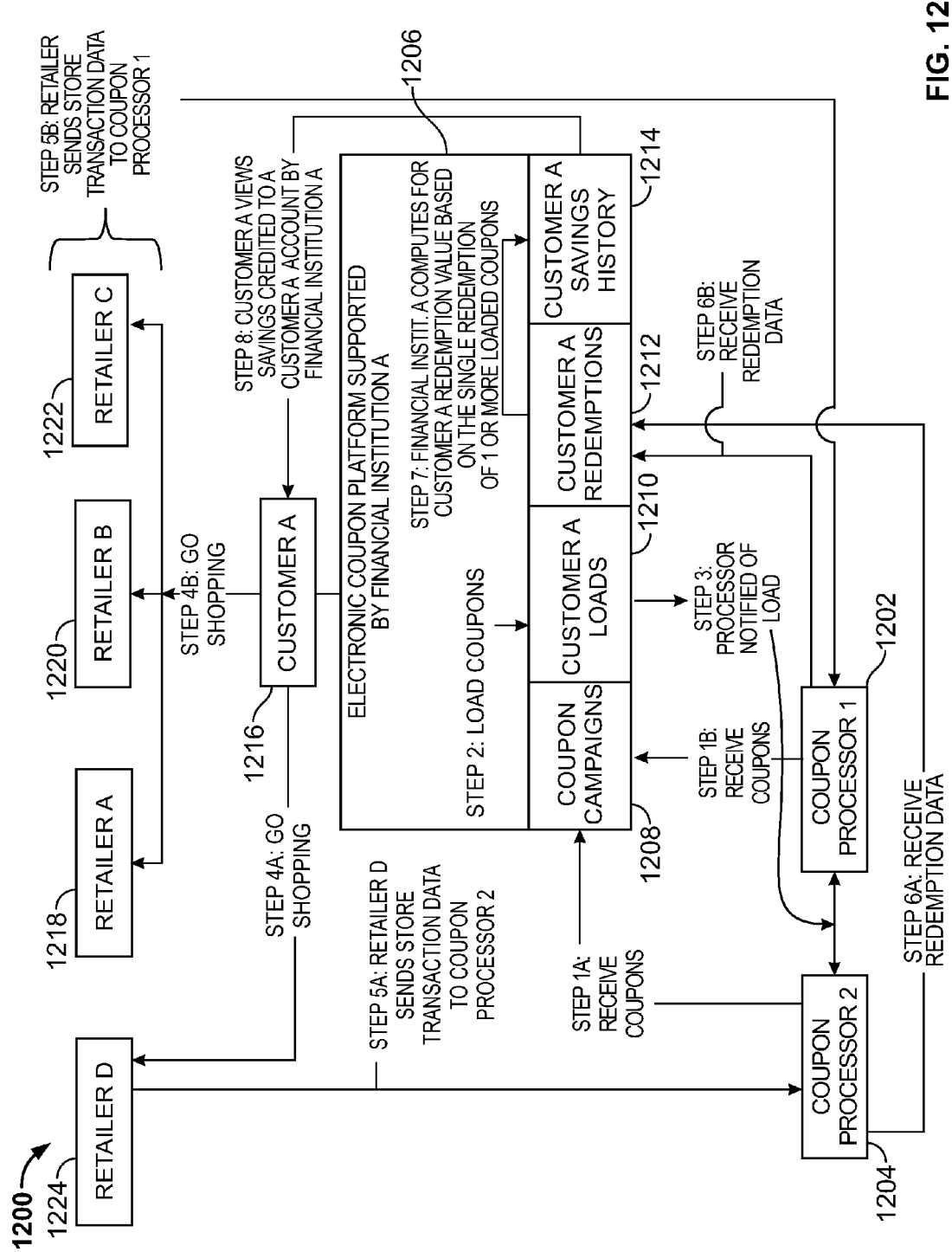
FIG. 12 is still another flow diagram of a process in accordance with the principles of the invention.

FIG. 12 shows illustrative process 1200 in accordance with systems and methods of the invention. Illustrative process 1200 may include elements 1202-1224. Element 1202 may represent coupon processor 1 and element 1204 may represent coupon processor 2. Coupon processor 2 may be in electronic communication with retailer D, illustrated in element 1204. Retailer D may be may be a POS terminal located at a retail store. Coupon processor 1 may be in electronic communication with retailers A-C, illustrated in elements 1218, 1220 and 1222, respectively. Retailers A-C may be POS terminals located at one or more retail stores.

Element 1206 may represent an electronic coupon platform. The electronic coupon platform may be supported by financial institution A. The electronic coupon platform may support multiple functionalities, including coupon campaigns 1208, customer A loads 1210, customer A redemptions 1212, and storage of customer A savings history 1214.

Illustrative process 1200 may be a process that includes one or more of steps 1-7. Coupon campaigns 1208 may receive coupons from coupon processor 2 at step 1A. Coupon campaigns 1208 may receive coupons from coupon processor 1 at step 1B. Customer A, represented by element 1216, may load coupons onto a database associated with customer A loads 1210 at step 2. Coupon processors 1 and 2 may be notified of the load at step 3. Upon notification of the load at step 3, coupon processors 1 and 2 may store data relating to customer A's loaded coupons in a customer profile associated with customer A. The data may be stored in a customer profile database that includes multiple customer profiles.

Customer A may go shopping at a retail location associated with retailer D at step 4A. Retailer D may send store transaction data (such as receipt of the loyalty card and/or payment instrument, purchase details, etc.) to coupon processor 2 at step 5A. Coupon processor 2 may transmit redemption data to customer A redemptions 1212 at step 6A. The redemption data may relate to electronic coupons stored in customer A's customer profile that are eligible to be redeemed based on customer A's purchase at retailer D.

Customer A may additionally choose to go shopping at a retail location associated with one of retailers A-C in step 4B. One of retailers A-C may send store transaction data (such as receipt of the loyalty card and/or payment instrument, purchase details, etc.) to coupon processor 1 at step 5B. Coupon processor 1 may transmit redemption data to customer A redemptions 1212 at step 6B. The redemption data may relate to electronic coupons stored in customer A's customer profile that are eligible to be redeemed based on customer A's purchase at one of retailers A-C.

At step 7, financial institution A may compute a customer A redemption value based on the redemption data received from coupon processors 1 and 2. The customer A redemption value may be credited to a customer A account. Financial institution A may use the systems and methods of the invention to ensure that, in the event that customer A purchased an item at one of retailers A-C and purchased the same item at retailer D, customer A does not receive credit twice for a coupon eligible to be redeemed via the purchase of the item.

In some embodiments, in the event that financial institution A determines that redemption data received from a coupon processor is eligible to be used in computing the customer A redemption value, financial institution A may inform the coupon processor of the eligibility of the data. Additionally, in some embodiments, in the event that financial institution A determines that redemption data received from a coupon processor is ineligible to be used in computing the customer A redemption value, financial institution A may inform the coupon processor of the ineligibility status of the data.

At step 8, customer A may view the savings credited to a customer A account by financial institution A. Financial institution A may credit the customer A savings account by depositing a value of funds corresponding to the customer A redemption value in the customer A account.

Figure 13:
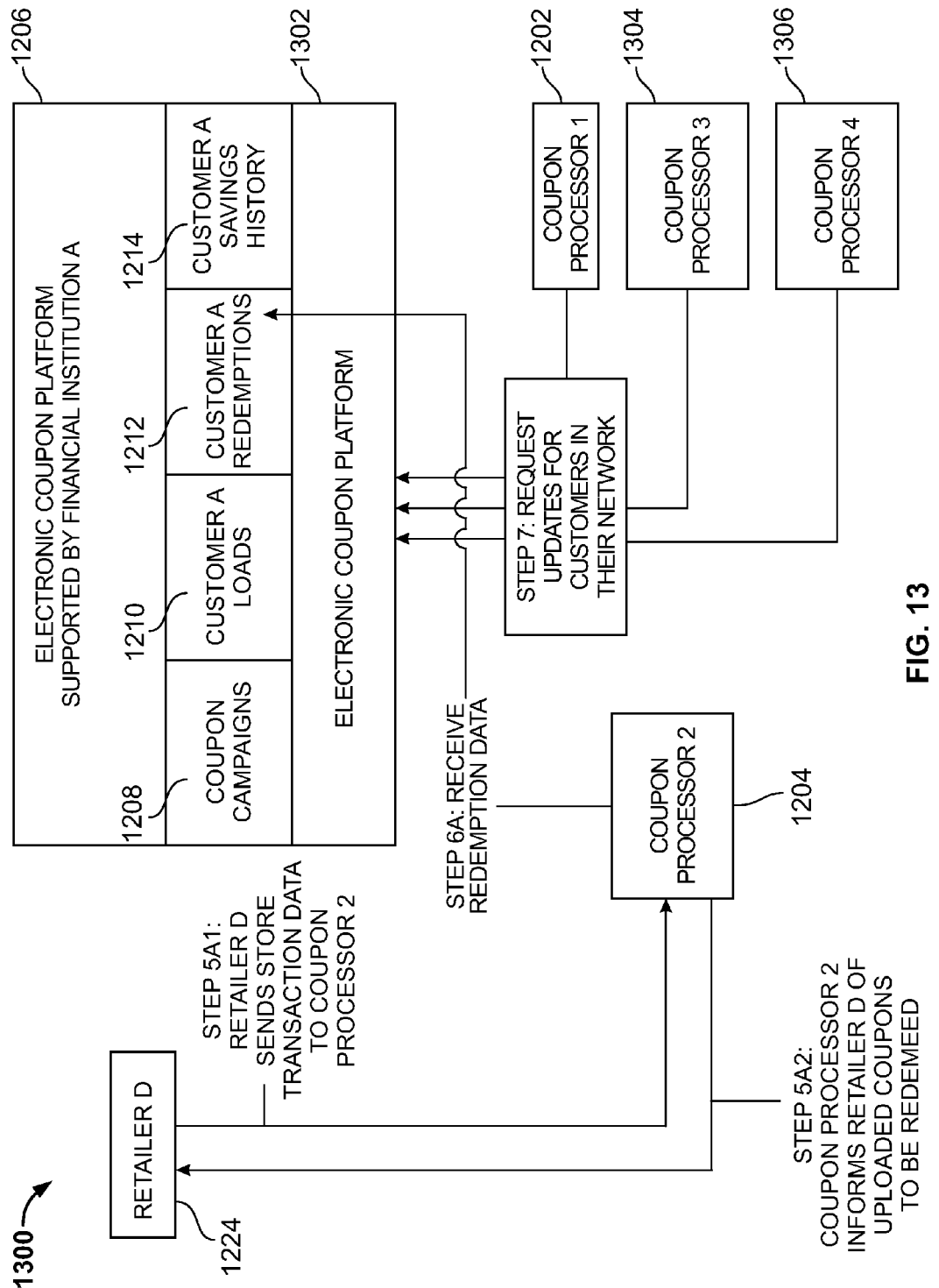
FIG. 13 is still another flow diagram of a process in accordance with the principles of the invention.

FIG. 13 shows illustrative process 1300 in accordance with systems and methods of the invention. Illustrative process 1300 may include one or more of steps 1-4 included in illustrative process 1200.

Illustrative process 1300 may include elements 1202-1214 and element 1224 illustrated in illustrative process 1200. Illustrative process 1300 may also include electronic coupon platform 1302. Electronic coupon platform 1302 may be an interface included in the electronic coupon platform supported by financial institution A. Electronic coupon platform 1302 may be in electronic communication with, or an integral part of, coupon campaigns 1208, customer A loads 1210, customer A redemptions 1212, and/or storage of customer A savings history 1214.

Illustrative process 1300 may additionally include coupon processors 3 and 4, represented by elements 1304 and 1306, respectively. Coupon processors 3 and 4 may be in electronic communication with one or more POS terminals at one or more retail locations (not shown).

Retailer D may send store transaction data (such as receipt of a loyalty card and/or payment instrument, purchase details, coupon redemption data, etc.) to coupon processor 2 at step 5A1. Coupon processor 2 may inform retailer D of uploaded coupons to be redeemed at step 5A2. Coupon processor 2 may subsequently update customer A information stored in a coupon processor 2 database. Coupon processor 2 may transmit redemption data to customer A redemptions 1212 at step 6A. It should be noted that in other embodiments, coupon processor 2 may transmit the redemption data to electronic coupon platform 1302.

Upon the expiration of a predetermined time period, coupon processors 1, 3 and 4 may request updates for customers in their network from electronic coupon platform 1302 at step 7. It should be noted that, in response to the coupon processors' request for updates, electronic coupon platform 1302 may transmit customer data to each of the coupon processors. The transmitted data may include the redemption data that the electronic coupon platform received from coupon processor 2, in addition to any other redemption data that the electronic coupon platform received during the predetermined time period. In some embodiments, the transmitted data may also include data that the customer has modified during the predetermined time period. The customer may have modified the data using customer A loads 1310 and/or a web-based portal in accordance with the systems and methods of the invention. Upon receipt of the transmitted data, each of coupon processors 1, 3 and 4 may update their data based on the received data.

Figure 14:
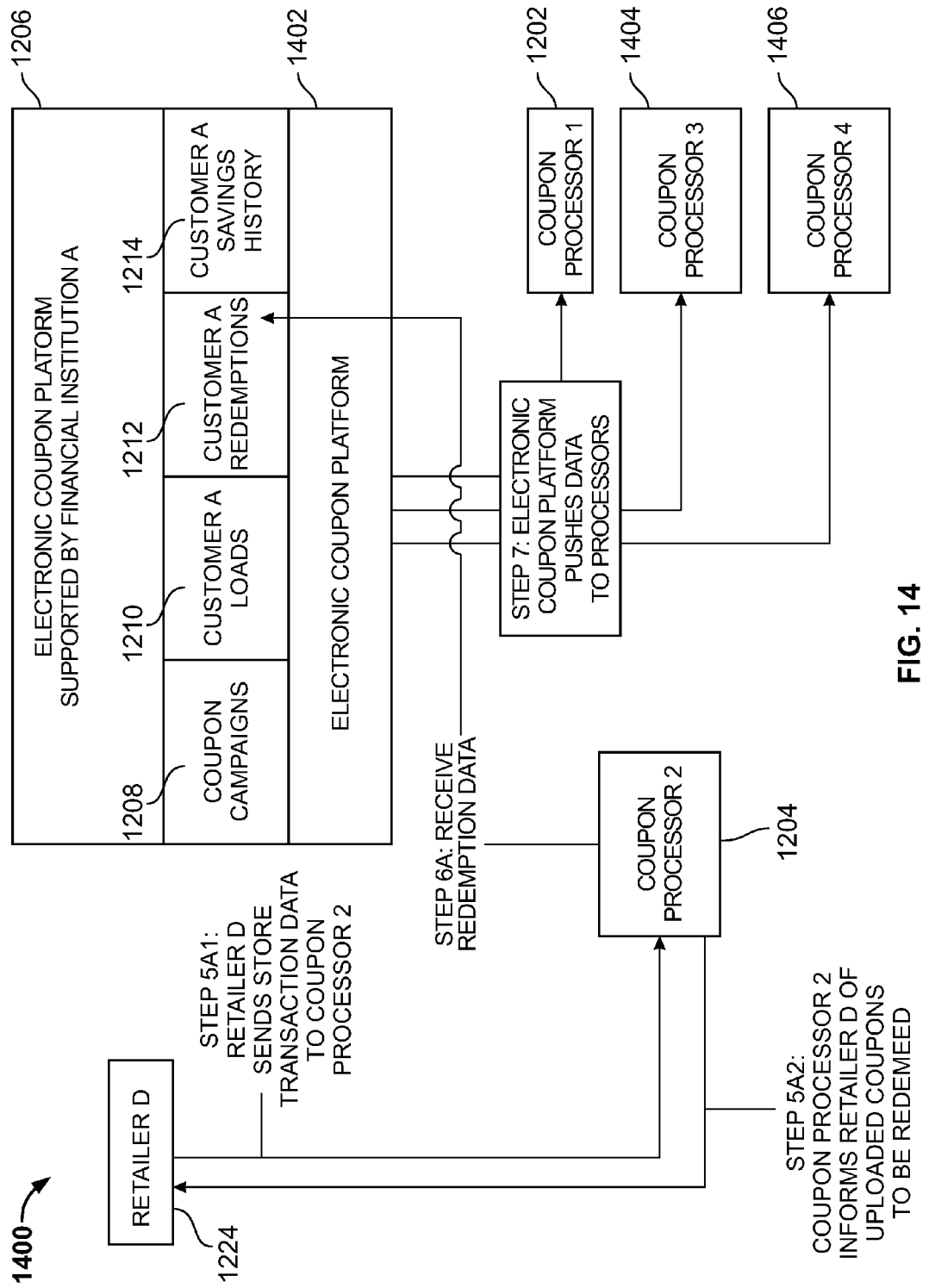
FIG. 14 is still another flow diagram of a process in accordance with the principles of the invention.

FIG. 14 shows illustrative process 1400 in accordance with systems and methods of the invention. Illustrative process 1400 may include one or more of steps 1-4 included in illustrative process 1200.

Illustrative process 1400 may include elements 1202-1214 and element 1224 illustrated in illustrative process 1200. Illustrative process 1400 may also include electronic coupon platform 1402. Electronic coupon platform 1402 may be an interface included in the electronic coupon platform supported by financial institution A. Electronic coupon platform 1402 may be in electronic communication with, or an integral part of, coupon campaigns 1208, customer A loads 1210, customer A redemptions 1212, and/or storage of customer A savings history 1214.

Illustrative process 1400 may additionally include coupon processors 3 and 4, represented by elements 1404 and 1406, respectively. Coupon processors 3 and 4 may be in electronic communication with one or more POS terminals at one or more retail locations (not shown).

Retailer D may send store transaction data (such as receipt of a loyalty card and/or payment instrument, purchase details, coupon redemption data, etc.) to coupon processor 2 at step 5A1. Coupon processor 2 may inform retailer D of uploaded coupons to be redeemed at step 5A2. Coupon processor 2 may subsequently update customer A information stored in a coupon processor 2 database to include the redeemed status of the uploaded coupons configured to be redeemed at retailer D. Coupon processor 2 may also transmit redemption data to customer A redemptions 1212 at step 6A. It should be noted that in other embodiments, coupon processor 2 may transmit the redemption data to electronic coupon platform 1402.

The electronic coupon platform may push data to coupon processors 1, 3 and 4 at step 7. The electronic coupon platform may push the data upon the expiration of a predetermined time period. The transmitted data may include the redemption data that the electronic coupon platform received from coupon processor 2, in addition to any other redemption data that the electronic coupon platform received during the predetermined time period. In some embodiments, the transmitted data may also include data that the customer has modified during the predetermined time period. The customer may have modified the data using customer A loads 1210 and/or a web-based portal in accordance with the systems and methods of the invention. It should be noted that, upon receipt of the data from the electronic coupon platform, each of coupon processors 1, 3 and 4 update data relating to customer A in a customer profile database.

Figure 15:
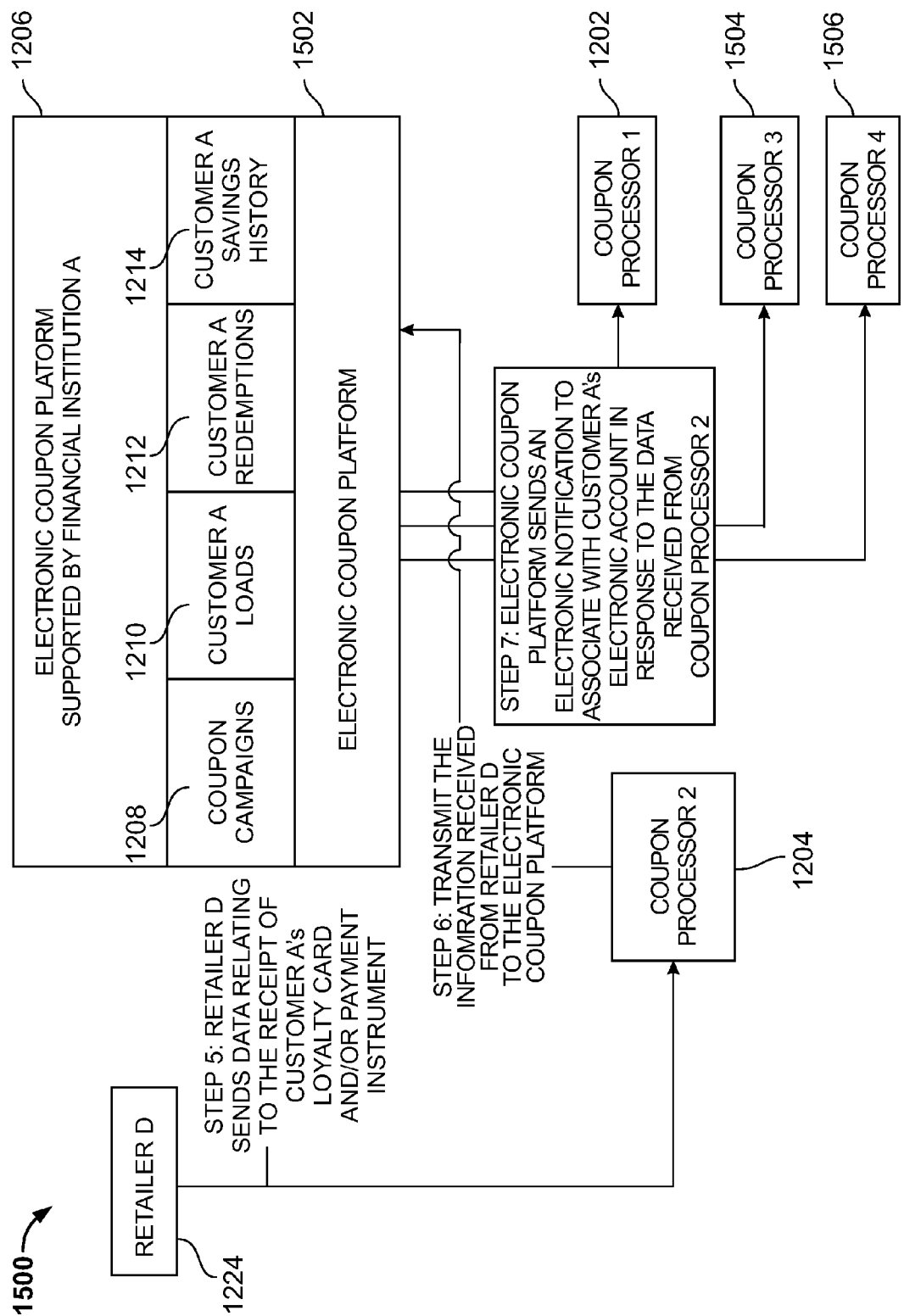
FIG. 15 is still another flow diagram of a process in accordance with the principles of the invention.

FIG. 15 shows illustrative process 1500 in accordance with systems and methods of the invention. Illustrative process 1500 may include one or more of steps 1-4 included in illustrative process 1200.

Illustrative process 1500 may include elements 1202-1214 and element 1224 illustrated in illustrative process 1200. Illustrative process 1500 may also include electronic coupon platform 1502. Electronic coupon platform 1502 may be an interface included in the electronic coupon platform supported by financial institution A. Electronic coupon platform 1502 may be in electronic communication with, or an integral part of, coupon campaigns 1208, customer A loads 1210, customer A redemptions 1212, and/or customer A savings history 1214.

Illustrative process 1500 may additionally include coupon processors 3 and 4, illustrated by elements 1504 and 1506, respectively. Coupon processors 3 and 4 may be in electronic communication with one or more POS terminals at one or more retail locations (not shown).

At step 5, retailer D may send data relating to the receipt of customer A's loyalty card and/or payment instrument to coupon processor 2. At step 6, coupon processor 2 may transmit the data received from retailer D to the electronic coupon platform. At step 7, the electronic coupon platform may transmit an electronic notification to associate with customers A's electronic account. The electronic coupon platform may transmit the notification to coupon processors 1, 3 and 4. The electronic coupon platform may transmit the electronic message in response to the data received from coupon processor 2. The association of the electronic notification to customer A's electronic account may result in coupon processors 1, 3 and 4 transmitting an electronic request for customer A information to the electronic coupon platform in the event that the coupon processors receive information from a POS terminal relating to the receipt of customer A's loyalty card and/or payment instrument information.

FIG. 16 shows illustrative process 1600 in accordance with systems and methods of the invention. Illustrative process 1600 may include elements 1602-1620. Elements 1602, 1604, 1606 and 1608 may represent coupon processors 1, 2, 3 and 4, respectively. Each of coupon processors 1-4 may be in electronic communication with one or more POS terminals at one or more retail locations (not shown).

Element 1610 may represent an electronic coupon platform. The electronic coupon platform may be supported by financial institution A. The electronic coupon platform may support multiple functionalities, including coupon campaigns 1612, customer A loads 1614, customer A redemptions 1616 and storage of customer A savings history 1618. Electronic coupon platform 1610 may additionally include electronic coupon platform 1620. In some embodiments, electronic coupon platform 1620 may be an interface included in electronic coupon platform 1610 that is in electronic communication with elements 1612-1618 and is configured to communicate with coupon processors 1-4.

Illustrative process 1600 may be a process that includes one or more of steps 1-3. Illustrative process 1600 may begin at step 1. Coupon campaigns 1612 may receive coupons from coupon processor 1 at step 1612. Customer A may load coupons onto customer A loads 1614 at step 2. Electronic coupon platform 1620 may notify coupon processors 1-4 of the customer load at step 3. The notification may occur substantially immediately after customer A loads the coupons at step 2.

One or more of coupon processors 1602, 1604, 1606 and 1608 may be grouped in a category that includes the coupon processor that transmitted the data to the electronic coupon platform. As such, when a coupon processor affiliated with a first grouping and/or other identification sends information to an electronic coupon platform relating to the receipt of a loyalty card and/or payment instrument at a POS terminal, the electronic coupon platform may transmit an electronic notification to a plurality of coupon processors associated with the same grouping. Accordingly, processing and/or other system overhead may be reduced by only transmitting notifications to selected retailers.

Such selection may be system-defined or user-defined. For example, the system may have predetermined codes that group certain retailers and/or processors in categories. Alternatively, a user may group certain retailers and/or processors in categories. In such embodiments, coupons and/or electronic notifications may be selectively distributed to the retailers and/or processors. Such selective distribution may be according to either the grouping associated with the retailers and/or processors, the identifications associated with the coupons or some combination of the two.

Thus, apparatus and methods for distributing and redeeming electronic coupons are provided. Persons skilled in the art will appreciate that the present invention can be practiced by other than the described embodiments, which are presented for purposes of illustration rather than of limitation, and that the present invention is limited only by the claims that follow.

What is claimed is:

1. Apparatus for redeeming an electronic coupon, the apparatus comprising an electronic coupon platform, the electronic coupon platform comprising:

a receiver module including hardware configured to receive data relating to the redemption of a plurality of electronic coupons by a customer, wherein the data includes an electronic coupon identifier associated with each of the plurality of electronic coupons;

a storage module including hardware configured to store the data relating to the redemption of the plurality of electronic coupons, the stored data being associated with the customer; and a processor module including hardware configured to initiate a deposit of an amount of funds in a customer bank account associated with the customer at predetermined time intervals;

wherein:

each electronic coupon identifier is associated with a redemption value; and the processor module is further configured to electronically calculate the amount of funds, the calculation including removing all duplications of electronic coupon identifiers included in the data and summing the redemption values associated with the remaining electronic coupon identifiers.

2. The apparatus of claim 1, wherein upon the completion of storage of the data relating to the redemption of an electronic coupon, the electronic coupon platform transmits data to a plurality of coupon processors relating to the redeemed status of the coupons associated with the electronic coupon identifiers.

3. The apparatus of claim 2, wherein upon receipt of the data from the electronic coupon platform, the coupon processors delete stored data associated with the customer that relates to the redeemed coupons.

4. The apparatus of claim 1, wherein upon completion of the deposit of the amount of funds in the customer bank account, the electronic coupon platform transmits an electronic notification to the customer, the electronic notification detailing the redeemed coupons and the corresponding amount of funds deposited in the customer bank account.

* * * * *